US011830998B2

(12) United States Patent
Jung et al.

(10) Patent No.: US 11,830,998 B2
(45) Date of Patent: Nov. 28, 2023

(54) COOLING STRUCTURE AND BATTERY SYSTEM INCLUDING THE SAME

(71) Applicant: SAMSUNG ELECTRONICS CO., LTD., Suwon-si (KR)

(72) Inventors: Daebong Jung, Seongnam-si (KR); Jeongsik Ko, Hanam-si (KR); Ji-Young Jeong, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 614 days.

(21) Appl. No.: 16/855,257

(22) Filed: Apr. 22, 2020

(65) Prior Publication Data

US 2021/0194077 A1   Jun. 24, 2021

(30) Foreign Application Priority Data

Dec. 20, 2019   (KR) .................. 10-2019-0171863

(51) Int. Cl.
*H01M 10/656* (2014.01)
*H01M 10/613* (2014.01)
*H01M 10/6552* (2014.01)

(52) U.S. Cl.
CPC ....... *H01M 10/656* (2015.04); *H01M 10/613* (2015.04); *H01M 10/6552* (2015.04)

(58) Field of Classification Search
CPC ............. H01M 10/613; H01M 10/625; H01M 10/647; H01M 10/6552; H01M 10/6557; H01M 10/656; H01M 10/6561; H01M 10/6567; H01M 2220/20; H01M 50/209; H01M 50/249; H01M 50/258; H01M 50/264; Y02E 60/10
See application file for complete search history.

(56) References Cited

U.S. PATENT DOCUMENTS

| | | | |
|---|---|---|---|
| 7,851,080 B2 | 12/2010 | Weber et al. | |
| 7,879,485 B2 | 2/2011 | Yoon et al. | |
| 8,117,857 B2 | 2/2012 | Kelty et al. | |
| 8,383,260 B2 | 2/2013 | Essinger et al. | |
| 8,508,191 B2 | 8/2013 | Kim et al. | |
| 8,618,775 B2 | 12/2013 | Hermann et al. | |
| 8,624,560 B2 | 1/2014 | Ungar et al. | |
| 8,961,203 B2 | 2/2015 | Lee | |
| 8,972,213 B2 | 3/2015 | Zhang et al. | |
| 2009/0111010 A1* | 4/2009 | Okada | H01M 10/625 429/120 |

(Continued)

FOREIGN PATENT DOCUMENTS

| | | |
|---|---|---|
| JP | 2002-42753 A | 2/2002 |
| JP | 2008-159439 A | 7/2008 |

(Continued)

*Primary Examiner* — Lingwen R Zeng
(74) *Attorney, Agent, or Firm* — NSIP Law

(57) ABSTRACT

A cooling structure includes a plurality of bars arranged separately from each other and configured to press a battery cell, a support configured to support the plurality of bars, flow paths defined by a first surface of the battery cell and one pair of neighboring bars, and configured to guide a flow of a cooling medium, with the cooling medium being in direct contact with the first surface of the battery cell, and a separation wall provided in at least one of the flow paths and being configured to separate each of the at least one flow path into sub-flow paths.

22 Claims, 18 Drawing Sheets

(56) References Cited

U.S. PATENT DOCUMENTS

| | | | | |
|---|---|---|---|---|
| 2012/0052359 A1* | 3/2012 | Yoshitake | ........... | H01M 50/264 |
| | | | | 429/120 |
| 2013/0122331 A1 | 5/2013 | McDonald | | |
| 2015/0188203 A1 | 7/2015 | Enomoto et al. | | |
| 2015/0270589 A1* | 9/2015 | Ejiri | .................... | H01M 10/647 |
| | | | | 429/72 |
| 2016/0156006 A1* | 6/2016 | Hoshino | ............. | H01M 10/625 |
| | | | | 429/96 |
| 2020/0136212 A1* | 4/2020 | Jung | ................ | H01M 10/6566 |

FOREIGN PATENT DOCUMENTS

| | | |
|---|---|---|
| JP | 2011-91043 A | 5/2011 |
| JP | 2015-5362 A | 1/2015 |
| KR | 10-2006-0052331 A | 5/2006 |
| KR | 10-2014-0109982 A | 9/2014 |
| KR | 10-2015-0025207 A | 3/2015 |
| KR | 10-2015-0025225 A | 3/2015 |
| KR | 10-2016-0069807 A | 6/2016 |
| KR | 10-2017-0022783 A | 3/2017 |
| KR | 10-2018-0091581 A | 8/2018 |
| KR | 10-2018-0133729 A | 12/2018 |
| WO | WO 2017/067923 A1 | 4/2017 |

* cited by examiner

COOLING STRUCTURE AND BATTERY SYSTEM INCLUDING THE SAME

CROSS-REFERENCE TO RELATED APPLICATIONS

This application claims the benefit under 35 USC § 119(a) of Korean Patent Application No. 10-2019-0171863 filed on Dec. 20, 2019, in the Korean Intellectual Property Office, the entire disclosure of which is incorporated herein by reference for all purposes.

BACKGROUND

1. Field

The following description relates to a cooling structure and a battery system including the cooling structure.

2. Description of Related Art

Technologies for cooling a battery cell that supply power for devices, such as a vehicle and a cellular phone are under development. A direct cooling method and an indirect cooling method may be used to cool a battery cell. The direct cooling method is a method through which heat is transferred when a cooling medium directly contacts a target that is to be cooled, whereas the indirect cooling method is a method through which heat is transferred through at least one intermediate layer between the cooling medium and the target.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a cooling structure including a plurality of bars arranged separately from each other and configured to press a battery cell, a support configured to support the plurality of bars, flow paths defined by a first surface of the battery cell and one pair of neighboring bars, and configured to guide a flow of a cooling medium, with the cooling medium being in direct contact with the first surface of the battery cell, and a separation wall provided in at least one of the flow paths and being configured to separate each of the at least one flow path into sub-flow paths.

The separation wall may include an extending portion having a height that extends between neighboring bars of one pair in an arrangement direction of the plurality of bars.

The separation wall may include a variable portion disposed at an end of the extending portion and having a width that varies in the arrangement direction of the plurality of bars.

The separation wall may include an extending portion having a length that extends in a longitudinal direction of the plurality of bars.

The separation wall may include a variable portion disposed at an end of the extending portion and having a width that varies in the longitudinal direction of the plurality of bars.

The support may include an inlet-side support may include an inlet path configured to guide the cooling medium to flow into the flow paths, and an outlet-side support may include an outlet path configured to guide the cooling medium to flow out of the flow paths.

The at least one flow path may include a divergent space defined between the inlet path and the separation wall, and configured to guide the cooling medium to diverge from the inlet path into the sub-flow paths, and a convergent space defined between the outlet path and the separation wall, and configured to guide the cooling medium to converge into the outlet path from the sub-flow paths.

The inlet-side support may include a first sealing groove configured to form a closed loop by surrounding the inlet path, and the outlet-side support may include a second sealing groove configured to form a closed loop by surrounding the outlet path.

The inlet-side support may include an inlet-side fastening portion configured to form a closed loop by surrounding the inlet path, protruding from a surface of the inlet-side support, and configured to be connected to an outlet-side support of another cooling structure, and the outlet-side support may include an outlet-side fastening portion configured to form a closed loop by surrounding the outlet path, protruding from a surface of the outlet-side support, and configured to be connected to an inlet-side support of another cooling structure.

The cooling structure may include a sealing portion configured to surround the plurality of bars and the flow paths.

The sealing portion may include one pair of longitudinal-direction grooves extending in a longitudinal direction of the plurality of bars and configured to be in contact with the first surface of the battery cell, and one pair of arrangement-direction grooves configured to be connected to the longitudinal-direction grooves and extending in an arrangement direction of the plurality of bars, and configured to be in contact with the first surface of the battery cell, wherein the one pair of the longitudinal-direction grooves and the one pair of the arrangement-direction grooves form a closed loop.

The sealing portion may include connecting grooves configured to connect the one pair of the longitudinal-direction grooves and the one pair of the arrangement-direction grooves and to form the closed loop, having a round shape, and configured to be in contact with the first surface of the battery cell.

The battery cell has a large area portion and a small area portion that is smaller in size than the large area portion, wherein the plurality of bars are configured to support the large area portion, and the support may be configured to support the small area portion.

The cooling structure may include a fluid connecting hole passing through the separation wall and being configured to allow the sub-flow paths to communicate with each other.

The support may include an inlet-side support may include an inlet path configured to guide a cooling medium to flow into the flow paths, and an outlet-side support may include an outlet path configured to guide the cooling medium to flow out of the flow paths, wherein the separation wall may include a first separation wall adjacent to the inlet path and a second separation wall adjacent to the outlet path, and the fluid connecting hole is formed between the first separation wall and the second separation wall.

In another general aspect, there is provided a batter system including battery cells each having a large area portion and a small area portion that is smaller in size than the large area portion, and cooling structures disposed in the large area portion of the battery cells, wherein each of the cooling structures may include bars disposed separately from each other and configured to press a corresponding battery cell, a support configured to support the bars and to extend in an arrangement direction of the bars, flow paths defined by a large area portion of the battery cell and one pair of neighboring bars, and configured to guide a flow of a cooling medium with the cooling medium being in direct contact with the large area portion of the battery cell, and a separation wall provided in at least one of the flow paths and being configured to separate each of the at least one flow path into sub-flow paths.

The battery system may include a first plate facing the small area portion of each of the battery cells, and configured to press the battery cells.

The first plate may include a base, and a fastening portion formed adjacent to an edge of the base, and being configured to be connected to a first plate of another battery system.

The fastening portion may include a side fastening portion adjacent to a side edge of the base, an upper fastening portion adjacent to an upper edge of the base, and a lower fastening portion adjacent to a lower edge of the base.

The support may include an inlet-side support may include an inlet path configured to guide the cooling medium to flow into the flow paths, and an outlet-side support may include an outlet path configured to guide the cooling medium to flow out of the flow paths, wherein the upper fastening portion and the lower fastening portion are disposed on a virtual centerline of the inlet path and a virtual centerline of the outlet path, respectively.

The first plate may include an upper protrusion may include the upper fastening portion and protruding from the base, and a lower protrusion may include the lower fastening portion and protruding from the base.

The battery system may include a second plate configured to be connected to the first plate, and configured to press a cooling structure disposed in a large area portion of an outermost battery cell among the battery cells against the outermost battery cell.

In another general aspect, there is provided a battery system including a first battery module, and a second battery module, wherein each of the first battery module and the second battery module may include battery cells, cooling structures disposed in a large area portion of the battery cells, and a first plate configured to cover a small area portion of battery cells, wherein each of the cooling structures may include bars disposed separately from each other and configured to press a corresponding battery cell, a support configured to support the bars and to extend in an arrangement direction of the bars, and flow paths defined by a large area portion of the battery cell and one pair of neighboring bars, and configured to guide a cooling medium with the cooling medium being in direct contact with the large area portion of the battery cell, wherein the first plate of the first battery module and the first plate of the second battery module are configured to be connected to each other.

The support may include an inlet-side support may include an inlet path configured to guide a flow of the cooling medium into the flow paths, and an outlet-side support may include an outlet path configured to guide a flow of the cooling medium out of the flow paths, wherein the battery system may include a gasket disposed between the first plate of the first battery module and the first plate of the second battery module, and being configured to tightly seal a space around the inlet path and the outlet path.

The gasket may include a gasket plate configured to be fastened to the first plate of the first battery module and the first plate of the second battery module, a gasket protrusion protruding from the gasket plate, and a connecting path formed in the gasket protrusion and configured to communicate with the inlet path and the outlet path.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
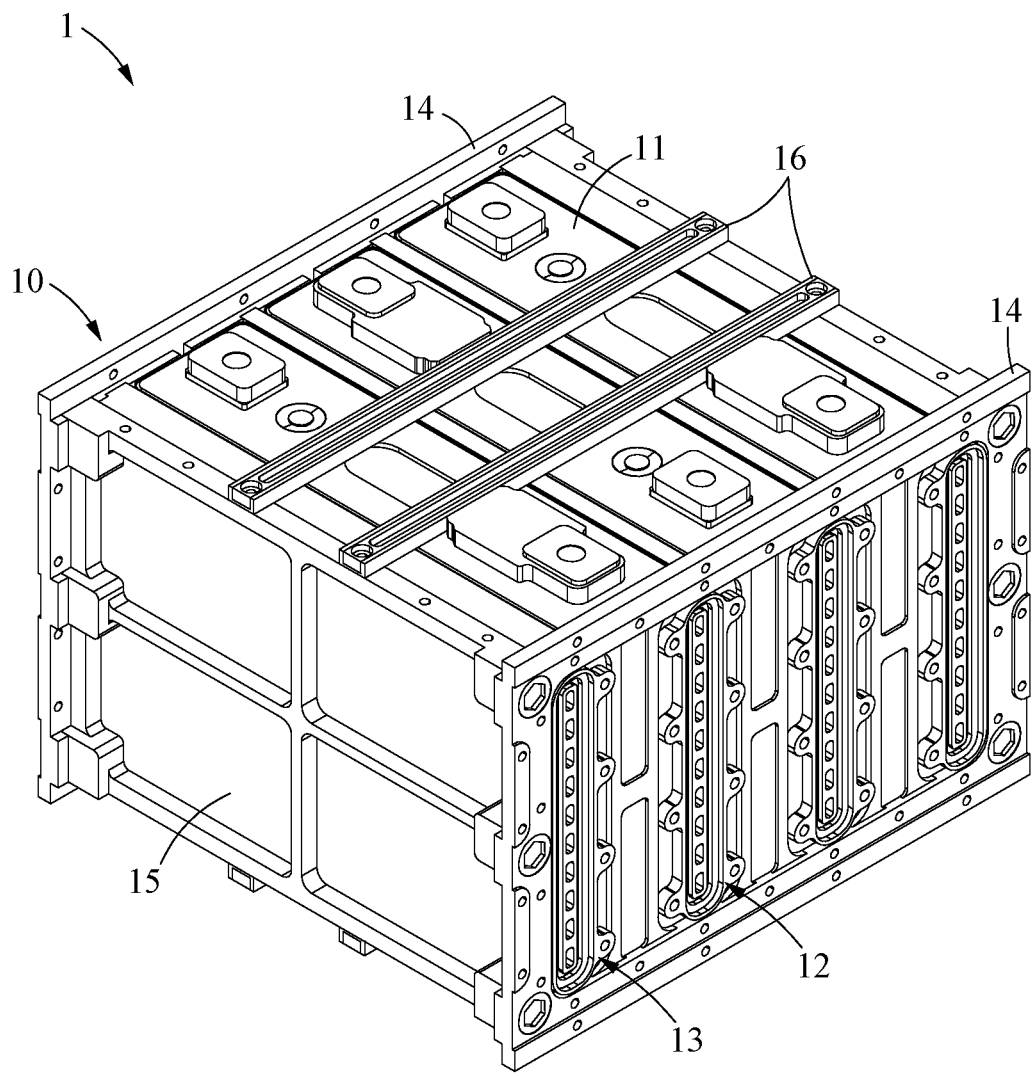
FIG. 1 is a diagram illustrating an example of a battery system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s). Although terms of "first" or "second" may be used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

Figure 2:
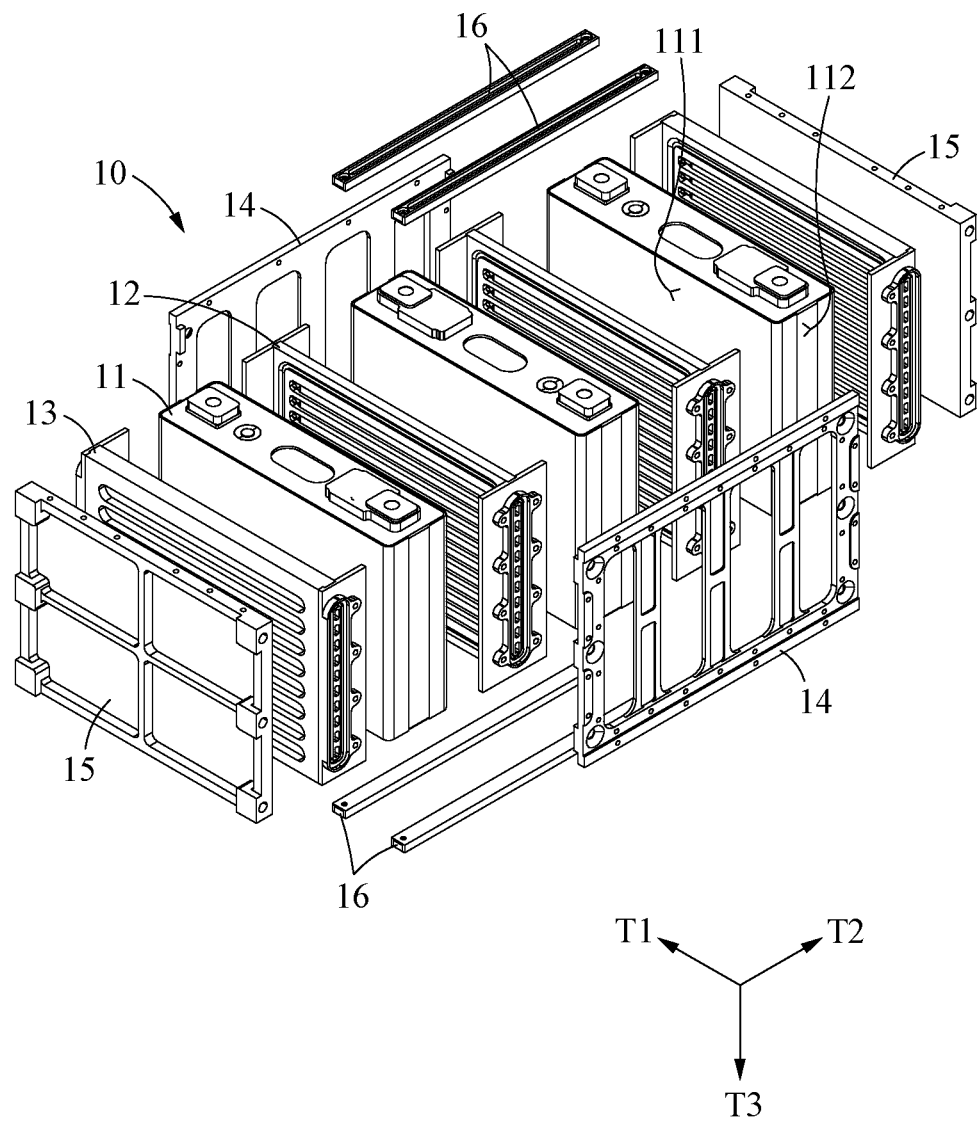
FIG. 2 is an exploded perspective view of an example of a battery system.

Referring to FIGS. 1 and 2, a battery system 1 may supply power to a target including a means of transportation, such as, for example, a vehicle.

The vehicle described herein refers to any mode of transportation, delivery, or communication such as, for example, an automobile, a truck, a tractor, a scooter, a motorcycle, a cycle, an amphibious vehicle, a snowmobile, a boat, a public transit vehicle, a bus, a monorail, a train, a tram, an autonomous or automated driving vehicle, an intelligent vehicle, a self-driving vehicle, an unmanned aerial vehicle, an electric vehicle (EV), a hybrid vehicle, a smart mobility device, an intelligent vehicle with an advanced driver assistance system (ADAS), or a drone. In an example, the smart mobility device includes mobility devices such as, for example, electric wheels, electric kickboard, electric scooter, and electric bike. In an example, vehicles include motorized and non-motorized vehicles, for example, a vehicle with a power engine (for example, a cultivator or a motorcycle), a bicycle or a handcart.

In addition to the vehicle described herein, methods and apparatuses described herein may be included in various other devices, such as, for example, a smart phone, a walking assistance device, a wearable device, a security device, a robot, a mobile terminal, and various Internet of Things (IoT) devices.

In an example, the battery system 1 includes one or more battery modules 10. A battery module 10 includes a plurality of battery cells 11, a plurality of cooling structures 12 and 13, a plurality of plates 14 and 15, and a plurality of fixing portions 16.

The battery cells 11 may generate power and supply the power to the target. As shown in FIG. 2, each of the battery cells 11 may have a large area portion 111 and a small area portion 112. The battery cells 11 may be arranged such that respective large area portions 111 of the battery cells 11 face each other, or respective small area portions 112 of the battery cells 11 face each other. In an internal space of a battery cell 11 that is defined by the large area portion 111 and the small area portion 112, an electrode assembly including a plurality of electrode plates and a separator disposed between the electrode plates, electrolyte, and the like may be provided. When a temperature of the battery cell 11 increases as the battery cell 11 operates, a temperature of the large area portion 111 may be greater than a temperature of the small area portion 112. Thus, the large area portion 111 may need to be cooled off to prevent a thermal abuse or a thermal runaway of the battery cell 11.

The cooling structures 12 and 13 may cool the battery cells 11. In addition, the cooling structures 12 and 13 may press the battery cells 11. When the battery cells 11 are pressed by a pressure greater than or equal to a set pressure, a power supply efficiency of the battery cells 11 may be improved.

Figure 3:
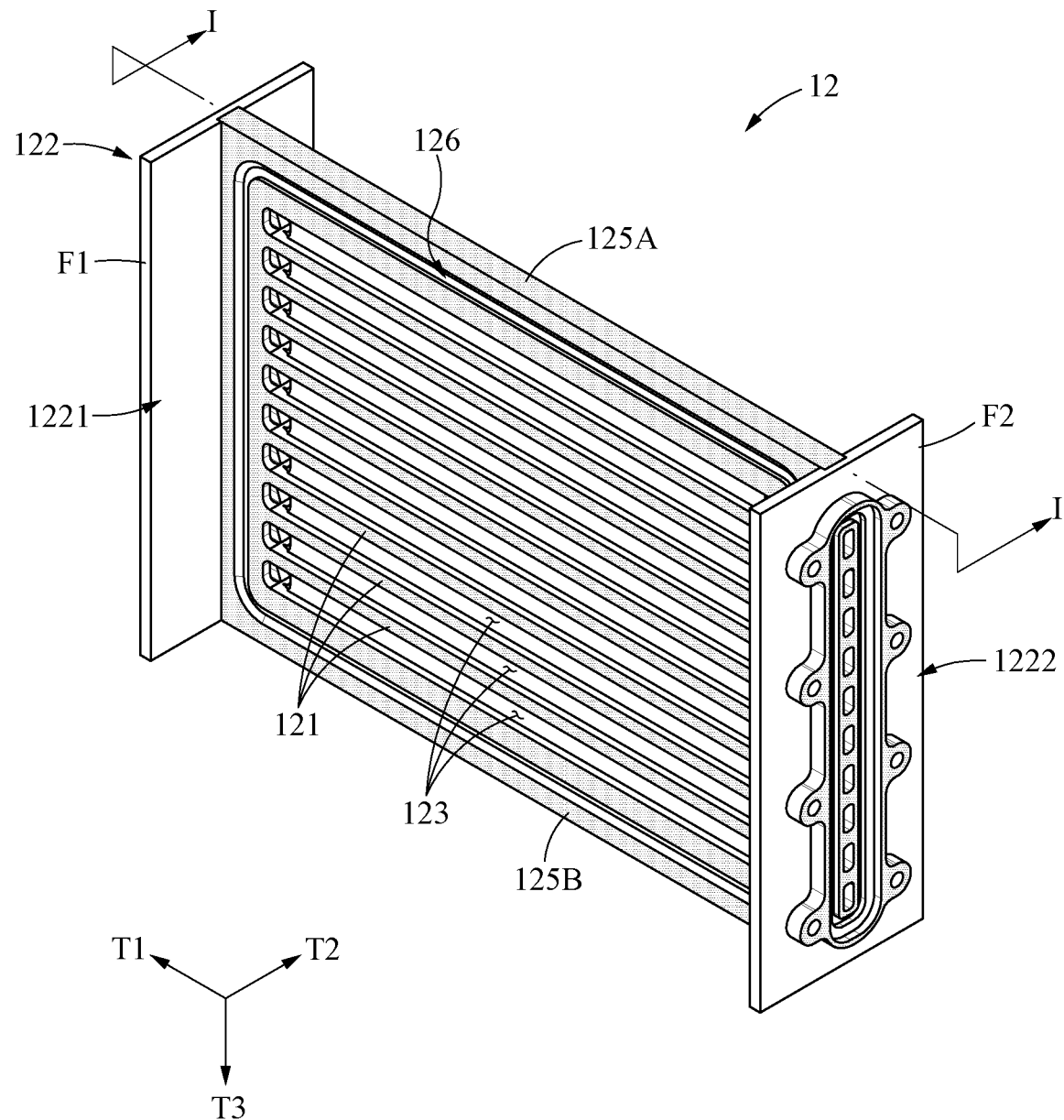
FIG. 3 is a diagram illustrating an example of a first cooling structure.
Figure 4:
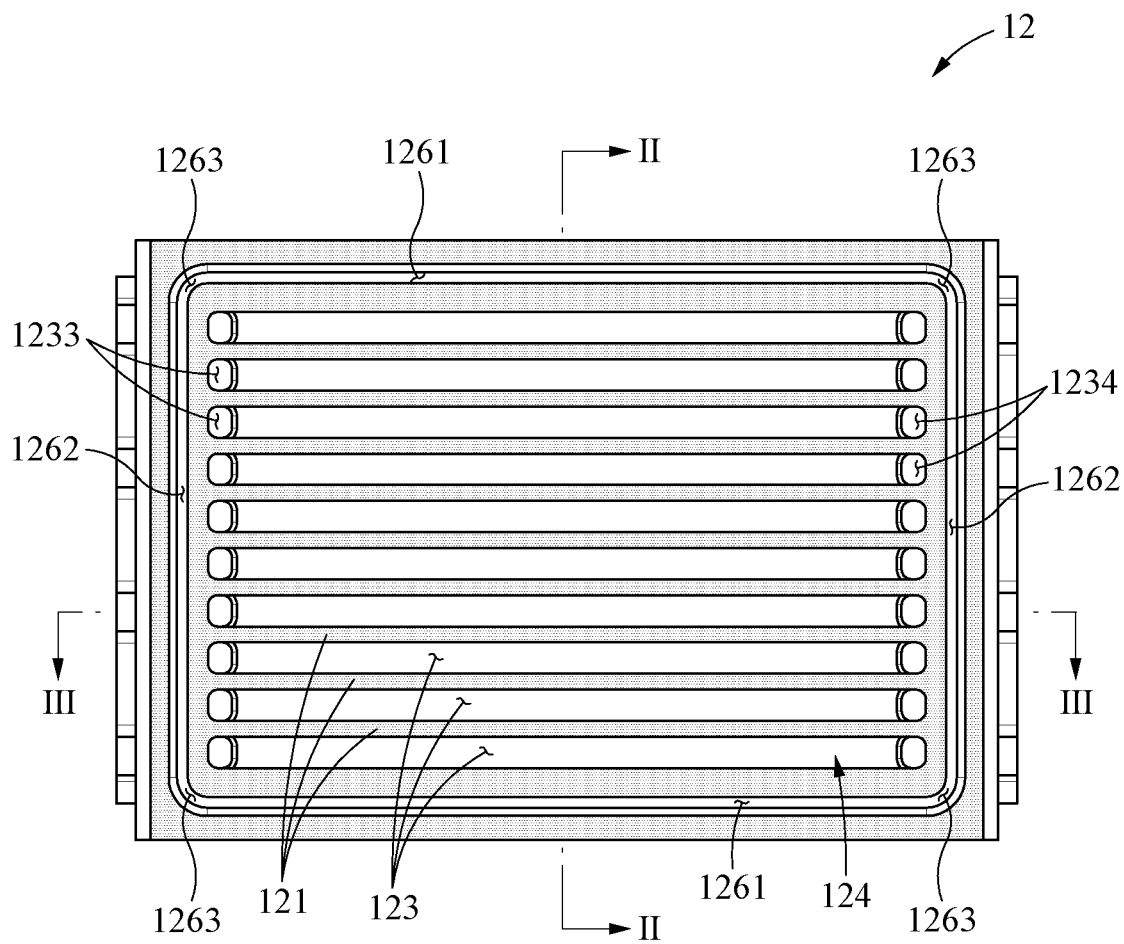
FIG. 4 is a front view of the first cooling structure of FIG. 3.
Figure 4:
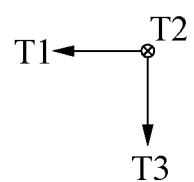

The cooling structures 12 and 13 include a first cooling structure 12 and a second cooling structure 13. The first cooling structure 12 may be disposed between neighboring battery cells 11 of one pair such that a flow path 123 (refer to FIG. 3) through which a cooling medium for cooling the battery cells 11 flows is formed between respective large area portions 111 of the neighboring battery cells 11. The cooling medium may include a liquid cooling medium including, for example, oil and water, and a gaseous cooling medium including, for example, air. The second cooling structure 13 may be disposed in a large area portion 111 of a battery cell 11 that is disposed on an outermost side among the arranged battery cells 11.

The plates 14 and 15 may cover and surround the battery cells 11 and the cooling structures 12 and 13. The plates 14 and 15 may thus protect the battery cells 11 from outside and prevent the battery cells 11 from moving. In addition, the plates 14 and 15 may enable the cooling structures 12 and 13 to press the battery cells 11. Thus, it is possible to improve a pressing force towards the battery cells 11, and to assemble the battery cells 11 and the cooling structures 12 and 13 more closely or tightly improving tightness therebetween.

The plates 14 and 15 include a first plate 14 and a second plate 15. The first plate 14 may be provided to connect the battery modules 10 and secure the expandability of the battery system 1. The first plate 14 may be disposed to face the small area portion 112 of each of the battery cells 11. The first plate 14 may provide a pressing force in a first direction T1 which is a longitudinal direction of the battery cells 11. In addition, when one battery module 10 is connected to another battery module 10, the first plate 14 may provide an equal fastening force to each of a plurality of connecting portions between the battery modules 10 of one pair to be connected, and thus ensure tightness between the battery modules 10 of one pair. The second plate 15 may be disposed to face the second cooling structure 13 that covers the battery cell 11 disposed on the outermost side among the battery cells 11. The second plate 15 may be connected to an edge of each of a plurality of first plates 14. The second plate 15 may provide a pressing force in a second direction T2 which is an arrangement direction of the battery cells 11, and thus prevent the large area portion 111 of each of the battery cells 11 from being deformed, for example, swollen. Here, the arrangement direction of the battery cells 11 may indicate a direction in which the battery cells 11 are arranged.

The fixing portions 16 may fix a plurality of second plates 15. The fixing portions 16 may be connected to an edge of each of the second plates 15. The fixing portions 16 may be connected to an upper edge or a lower edge of one of the second plates 15. In addition, the fixing portions 16 may cross the battery cells 11 and the cooling structures 12 and 13 to be connected to an upper edge or a lower edge of another one of the second plates 15. For example, the fixing portions 16 may be provided in a form of ribs.

Referring to FIGS. 3 through 11, the first cooling structure 12 includes a plurality of bars 121, a support 122, a plurality of flow paths 123, a plurality of separation walls 124, a plurality of frames 125A, 125B, 125C, and 125D, and a sealing portion 126. The frames 125A, 125B, 125C, and 125D include an upper frame 125A, a lower frame 125B, an inlet-side frame 125C, and an outlet-side frame 125D.

The bars 121 may support and press a battery cell 11. The bars 121 may have a length that extends in a first direction T1. For example, the bars 121 may extend in the first direction T1 which is a longitudinal direction of the battery cell 11. The bars 121 may be arranged separately from each other. For example, an arrangement direction in which the bars 121 are arranged may be a third direction T3 which is a height direction of the battery cell 11. The bars 121 may be disposed between neighboring battery cells 11 of one pair. In addition, both side surfaces of the bars 121 may be in contact with respective large area portions 111 of the neighboring battery cells 11 of one pair.

The bars 121 may be separated from each other with a desirable interval therebetween. Through this, it is possible to secure the flow paths 123 through which a cooling medium flows to be in direct contact with the battery cell 11, and also prevent the battery cell 11 from being deformed, for example, swollen, or prevent the flow paths 123 from being deformed by an external force. In addition, it is possible to design a flow rate of the cooling medium that flows in the flow paths 123. In an example, by designing intervals between neighboring bars 121 of pairs to be equal, it is possible to form the flow paths 123 to have a same cross-sectional area. In an example, the bars 121 may be separated from each other with different intervals therebetween to intensively cool a portion of the battery cell 11 in which a temperature increase is greater. In this example, when a temperature of a center portion of the battery cell 11 is highest, an interval between neighboring bars 121 of one pair adjacent to the center portion of the battery cell 11 may be greater than an interval between neighboring bars 121 of another pair adjacent to an upper portion or a lower portion of the battery cell 11. In an example that is not illustrated, the flow paths 123 may be disposed only in the center portion of the battery cell 11. In this example, the bars 121 may be disposed separately from each other only in the center portion of the battery cell 11, and a flow path for a cooling medium may not be formed in other portions of a space between neighboring battery cells 11 of one pair. This may relatively reduce an entire cross-sectional area of the flow paths 123, and be effective in improving a cooling effect on a certain portion.

The support 122 may support the bars 121. The support 122 includes an inlet-side support 1221 into which a cooling medium configured to cool the battery cell 11 flows based on a flowing direction of the cooling medium, and an outlet-side support 1222 from which the cooling medium flows out based on the flowing direction of the cooling medium. The inlet-side support 1221 may extend in the third direction T3 which is the arrangement direction of the bars 121, while being connected to a first end of the bars 121. The outlet-side support 1222 may extend in the third direction T3 which is the arrangement direction of the bars 121, while being connected to a second end of the bars 121 that is on an opposite side of the first end of the bars 121.

The inlet-side support 1221 includes an inlet-side flange F1 that extends from the first end of the bars 121 to a plane vertical to the first direction T1 which is the longitudinal direction of the bars 121. The outlet-side support 1222 includes an outlet-side flange F2 that extends from the second end of the bars 121 to a plane vertical to the first direction T1 which is the longitudinal direction of the bars 121. The inlet-side flange F1 and the outlet-side flange F2 may be disposed between neighboring battery cells 11 of one pair such that an interval is formed between the neighboring battery cells 11 of one pair. For example, the inlet-side flange F1 and the outlet-side flange F2 may be disposed in respective small area portion 112 of the neighboring battery cells 11 of one pair. Through this, it is possible to enable an electrical insulation between the neighboring battery cells 11. Thus, even when there is a thermal abuse or a thermal runaway in a battery cell 11, such a thermal abuse or thermal runway may not be transferred to a neighboring battery cell from the battery cell 11.

The inlet-side support 1221 includes the inlet-side flange F1, an inlet path P1, a first sealing groove G1, and an inlet-side fastening portion FT1.

The inlet-side flange F1 may extend to the plane vertical to the longitudinal direction of the bars 121.

Figure 5:
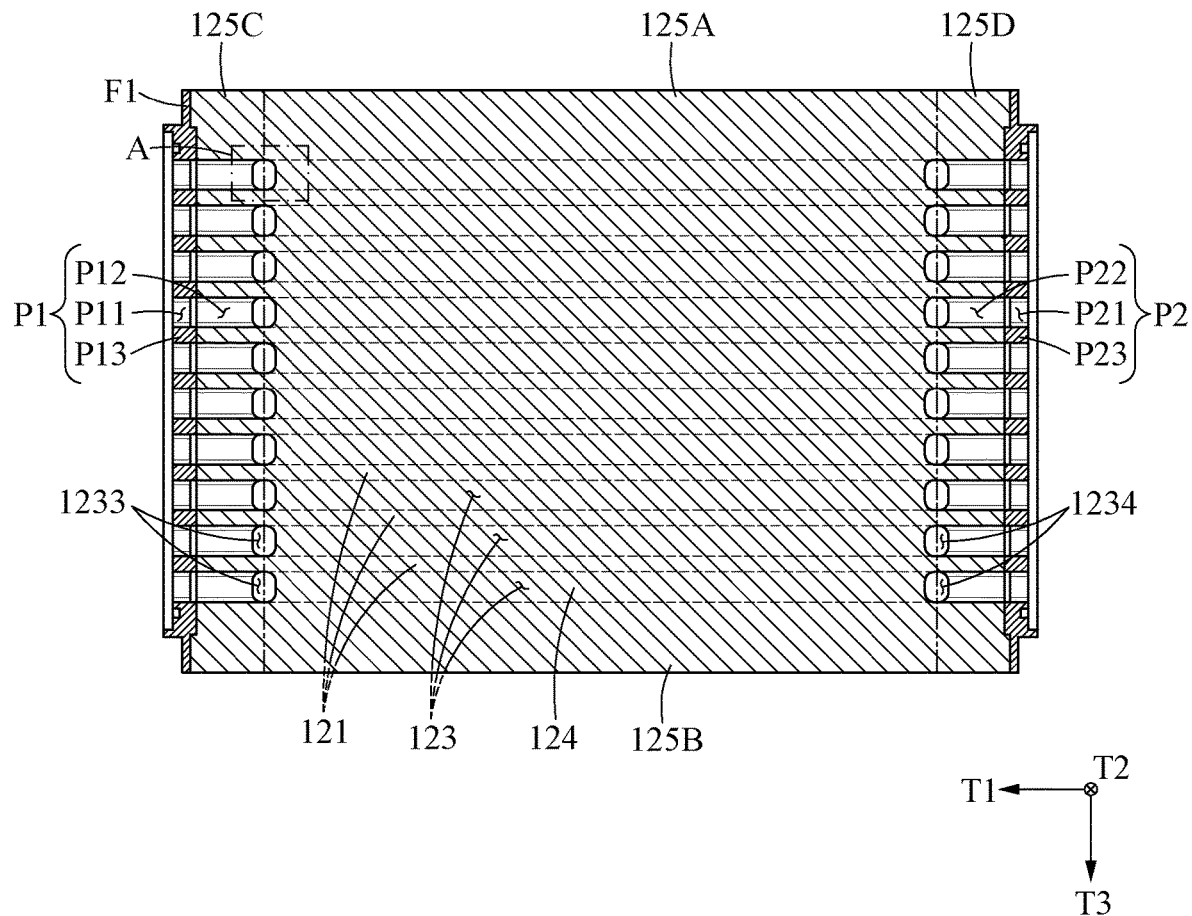
FIG. 5 is a cross-sectional view of the first cooling structure of FIG. 3 cut by a line I-I.
Figure 6:
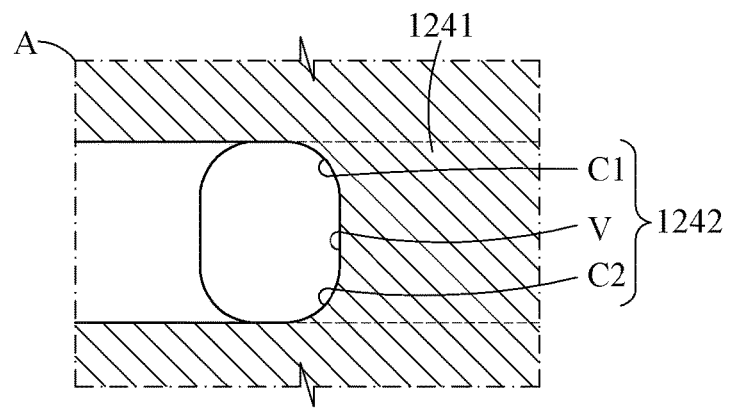
FIG. 6 is an enlarged view of an A portion of FIG. 5.
Figure 7:
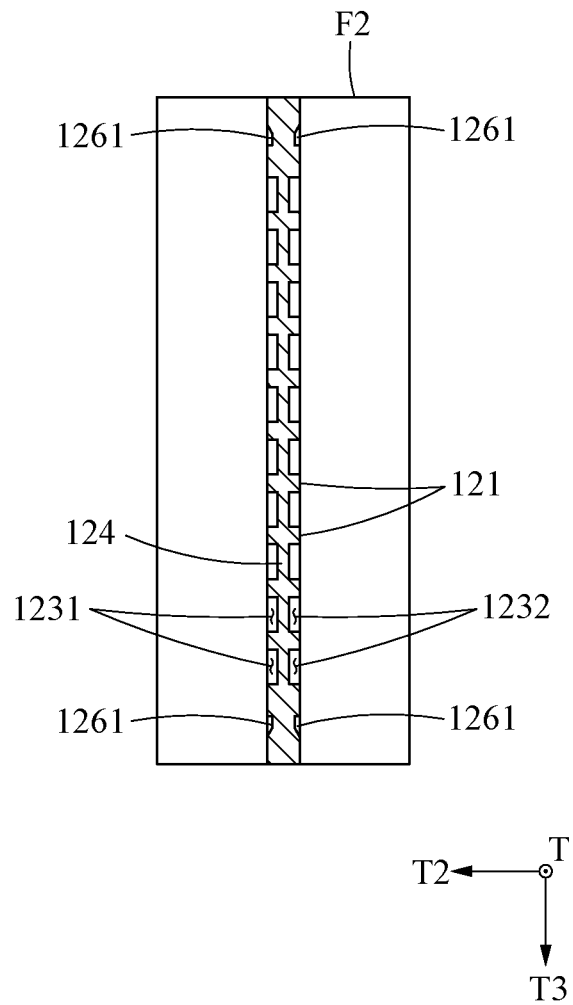
FIG. 7 is a cross-sectional view of the first cooling structure of FIG. 4 cut by a line II-II.

As shown in FIG. 5, the inlet path P1 may guide a cooling medium to flow into the flow paths 123. The inlet path P1 includes a plurality of inlet ports P11, a first channel P12, and a first divider P13. The inlet ports P11 may communicate with the flow paths 123 through a fluid. The inlet ports P11 may be disposed separately from each other along a height direction of the inlet-side support 1221. Through such a structure of the inlet path P1 including the inlet ports P11, it is possible to individually control a flow rate of the cooling medium that flows in the flow paths 123. For example, it is possible to increase a flow rate of a cooling medium that flows in a flow path 123 disposed in a center portion of a battery cell 11 among the flow paths 123, and decrease a flow rate of a cooling medium that flows in a flow path 123 disposed in an upper or lower portion of the battery cell 11 among the flow paths 123. A first end of a bar 121 may be disposed between neighboring inlet ports P11 of one pair. The first channel P12 may connect the inlet ports P11 and the flow paths 123 through a fluid. The first channel P12 may be led from the inlet-side flange F1 to a flow path 123 through the inlet-side frame 125C. The first divider P13 may form the inlet ports P11 by dividing the inlet path P1. The first divider P13 may be disposed between neighboring inlet ports P11 of one pair. The first divider P13 may overlap a bar 121 based on a longitudinal direction of the bar 121. The first divider P13 and a first end of the bar 121 may be fixed to each other.

Figure 10:
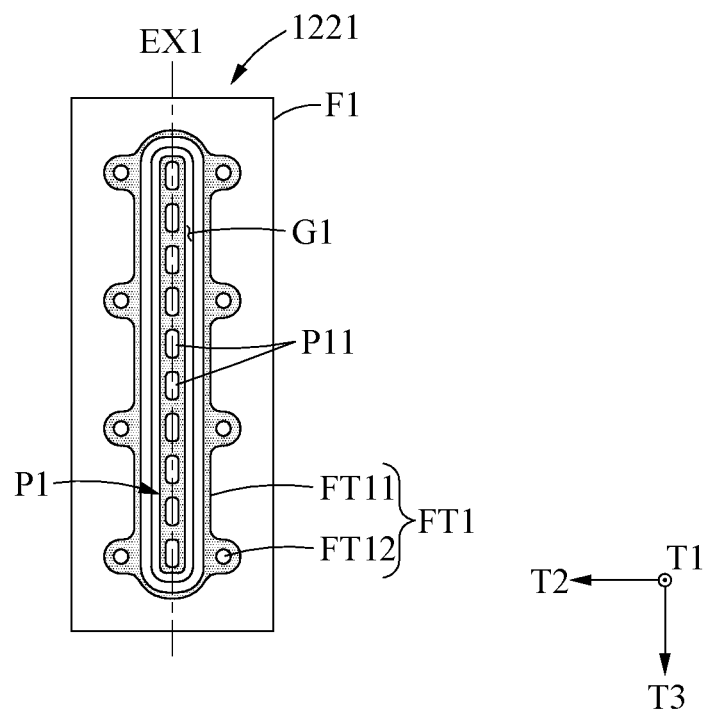
FIG. 10 is a front view of an inlet-side support of the first cooling structure of FIG. 3.

As shown in FIG. 10, in the inlet path P1, a virtual centerline EX1 may be defined. The virtual centerline EX1 of the inlet path P1 may be defined by a line that connects a center of one end of the inlet path P1 and a center of another end of the inlet path P1 in a longitudinal direction of the inlet path P1. For example, the virtual centerline EX1 of the inlet path P1 may be defined by an extension line that connects the inlet ports P11.

Figure 8:
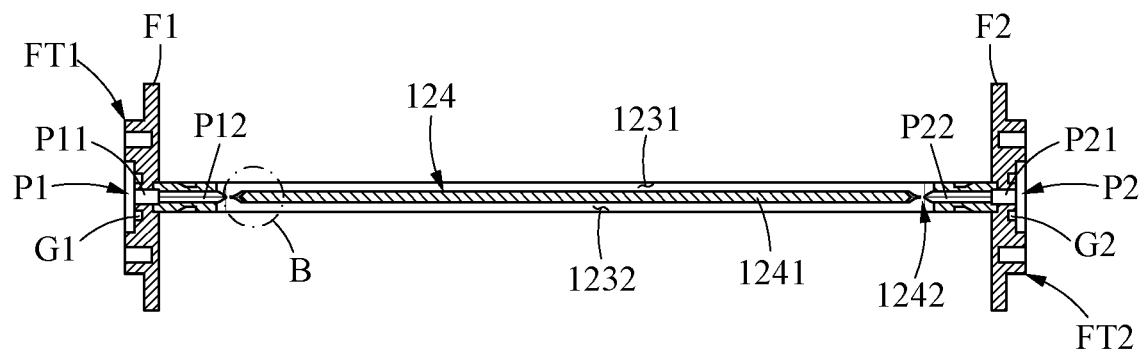
FIG. 8 is a cross-sectional view of the first cooling structure of FIG. 4 cut by a line III-III.

As shown in FIG. 8, the first sealing groove G1 may form a closed loop by surrounding the inlet path P1. To seal the inlet path P1, a sealing element (not shown) may be filled in the first sealing groove G1. The sealing element may include, for example, an O-ring and a liquid gasket. The first sealing groove G1 may be formed in a thickness direction of the inlet-side flange F1.

The inlet-side fastening portion FT1 may be connected to an outlet-side fastening portion FT2 of another first cooling structure 12. For example, such a connection between an inlet-side fastening portion FT1 of a first cooling structure 12 and an outlet-side fastening portion FT2 of another first cooling structure 12 may include, for example, bolt-nut fastening. When the inlet-side fastening portion FT1 of the first cooling structure 12 is connected to the outlet-side fastening portion FT2 of the other first cooling structure 12, a gasket SG (refer to FIG. 19) may be disposed between the inlet-side fastening portion FT1 and the outlet-side fastening portion FT2, and thus the gasket SG may also be connected thereto.

As shown in FIG. 10, the inlet-side fastening portion FT1 includes a first support wall FT11 configured to form a closed loop by extending around the first sealing groove G1, and a plurality of inlet-side fastening elements FT12 disposed separately from each other along the first support wall FT11 and formed on the first support wall FT11. The first support wall FT11 and the inlet-side fastening elements FT12 may protrude from the inlet-side flange F1. Through such a structure in which the first sealing groove G1 is formed between the inlet-side fastening portion FT1 and the inlet path P1, and such a structure with a height difference between the inlet-side fastening portion FT1 and the inlet path P1, it is possible to increase a level of tightness of the inlet path P1, and connect neighboring first cooling structures 12 of one pair.

The outlet-side support 1222 includes an outlet-side flange F2, an outlet path P2, a second sealing groove G2, and an outlet-side fastening portion FT2.

The outlet-side flange F2 may extend to a plane vertical to the longitudinal direction of the bars 121.

As shown in FIG. 5, the outlet path P2 may guide a cooling medium to flow out of the flow paths 123. The outlet path P2 includes a plurality of outlet ports P21, a second channel P22, and a second divider P23. The outlet ports P21 may communicate with the flow paths 123 through a fluid. The outlet ports P21 may be disposed separately from each other along a height direction of the outlet-side support 1222. A second end of a bar 121 may be disposed between neighboring outlet ports P21 of one pair. The second channel P22 may connect the outlet ports P21 and the flow paths 123 through a fluid. The second channel P22 may be led from a flow path 123 to the outlet flange F2 through the outlet-side frame 125D. The second divider P23 may be disposed between neighboring outlet ports P21 of one pair. The second divider P23 may overlap a bar 121 in a longitudinal direction of the bar 121. The second divider P23 and a second end of the bar 121 may be fixed to each other.

Figure 11:
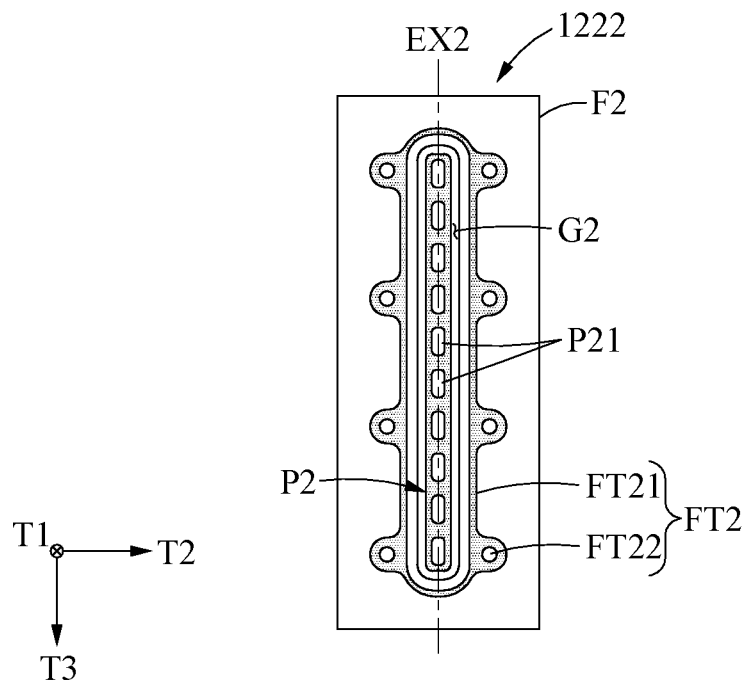
FIG. 11 is a front view of an outlet-side support of the first cooling structure of FIG. 3.

As shown in FIG. 11, in the outlet path P2, a virtual centerline EX2 may be defined. The virtual centerline EX2 of the outlet path P2 may be defined by a line that connects a center of one end of the outlet path P2 and a center of another end of the outlet path P2 in a longitudinal direction of the outlet path P2. For example, the virtual centerline EX2 of the outlet path P2 may be defined by an extension line that connects the outlet ports P21.

As shown in FIG. 11, the second sealing groove G2 may form a closed loop by surrounding the outlet path P2. To seal the outlet path P2, a sealing element (not shown) may be filled in the second sealing groove G2. The sealing element may include, for example, an O-ring and a liquid gasket. The second sealing groove G2 may be formed in a thickness direction of the outlet-side flange F2.

The outlet-side fastening portion FT2 may be connected to an inlet-side fastening portion FT1 of another first cooling structure 12. For example, a connection between an outlet-side fastening portion FT2 of a first cooling structure 12 and an inlet-side fastening portion FT1 of another first cooling structure 12 may include, for example, bolt-nut fastening. When the outlet-side fastening portion FT2 of the first cooling structure 12 is connected to the inlet-side fastening portion FT1 of the other first cooling structure 12, a gasket SG (refer to FIG. 19) may be disposed between the outlet-side fastening portion FT2 and the inlet-side fastening portion FT1, and thus the gasket SG may also be connected thereto.

The outlet-side fastening portion FT2 includes a second support wall FT21 configured to form a closed loop by extending around the second sealing groove G2, and a plurality of outlet-side fastening elements FT22 disposed separately from each other along the second support wall FT21 and formed on the second support wall FT21. The second support wall FT21 and the outlet-side fastening elements FT22 may protrude from the outlet-side flange F2. Through such a structure in which the second sealing groove G2 is formed between the outlet-side fastening portion FT2 and the outlet path P2, and such a structure with a height difference between the outlet-side fastening portion FT2 and the outlet path P2, it is possible to increase a level of tightness of the outlet path P2.

The flow paths 123 may guide a cooling medium to flow, with the cooling medium being in direct contact with the battery cells 11. A flow path 123 may be defined by a surface of a battery cell 11 and neighboring bars 121 of one pair. For example, the flow path 123 may be defined by a large area portion 111 among surfaces of the battery cell 11, and an upper surface and a lower surface that do not press the surfaces of the battery cell 11 among surfaces of the neighboring bars 121 of one pair. The cooling medium may directly contact the battery cells 11 as described above, and it is thus possible to improve a cooling effect through a direct heat transfer without an intervention of a heat transferring member such as, for example, a thermal pad, a conduit, and a cooling fin, between the battery cells 11 and the cooling medium that flows in the battery cells 11. In addition, the flow paths 123 may help solve an issue of a lopsided or unproportionate distribution of the cooling medium that may be leaned downwards due to an influence of gravity, and reduce a temperature difference in the battery cells 11 that may affect greatly the lifespan.

Figure 9:
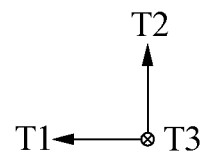
FIG. 9 is an enlarged view of a B portion of FIG. 8.
Figure 9:
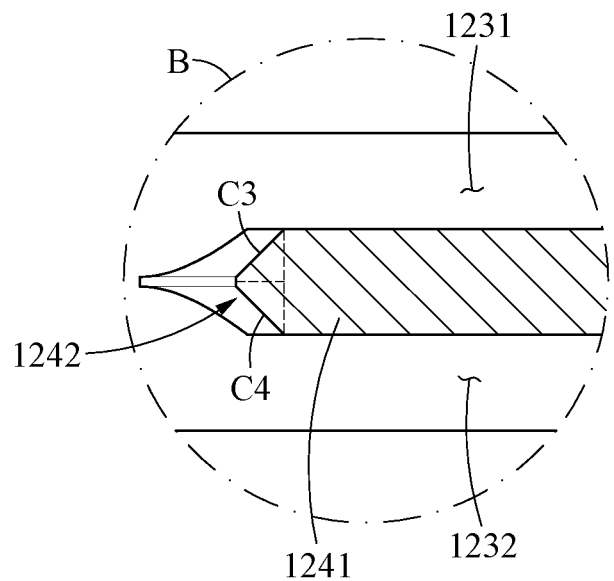

As shown in FIGS. 8-9, a separation wall 124 may separate a flow path 123 into sub-flow paths 1231 and 1232. The separation walls 124 may be respectively installed in the flow paths 123. The separation walls 124 may adjust a thickness of the flow paths 123, and thus maximize a forced convection effect of a cooling medium flowing in the flow paths 123. When there is a need to change a dimension, for example, a width, of a flow path 123 having a set flow rate in a first cooling structure 12 to cool a battery cell 11 having a set standard or specification, a separation wall 124 may separate the flow path 123 having the set flow rate into a plurality of sub-flow paths 1231 and 1232, and thus maintain or improve a speed of the cooling medium flowing in the flow path 123. Thus, even when the dimension of the flow path 123 is changed, it is possible to maintain or improve forced convection of the cooling medium flowing in the flow path 123 after the dimension is changed, compared to forced convection of the cooling medium flowing in the flow path 123 before the dimension is changed. It is thus possible to improve performance of the first cooling structure 12 in cooling the battery cell 11. Thus, by applying a same flow rate of the cooling medium flowing in the flow path 123 irrespective of such a structural change in the first cooling structure 12, the separation wall 124 may obtain a relatively greater cooling effect of the first cooling structure 12 on the battery cell 11.

In addition, a flow path 123 includes a divergent space 1233 and a convergent space 1234. Here, the term "being divergent" or "divergence" may indicate that a single flow diverges into a plurality of flows, and the term "being convergent" or "convergence" may indicate that a plurality of flows converges into a single flow. The divergent space 1233 may be a space defined between an inlet path P1 and a first end of a separation wall 124, and be a free space for guidance of a cooling medium that is led from the inlet path P1 to sub-flow paths 1231 and 1232. The convergent space 1234 may be a space defined between a second end of the separation wall 124 and an outlet path P2, and a free space for guidance of the cooling medium that is led from the sub-flow paths 1231 and 1232 to the outlet path P2.

As shown in FIG. 9, the separation wall 124 includes an extending portion 1241 that extends in a direction, and a variable portion 1242 that is formed at least one end of a first end or a second end of the extending portion 1241 and has a varying shape.

In an example, the extending portion 1241 may have a height that extends from one bar 121 of neighboring bars 121 of one pair to the other bar 121 of the neighboring bars 121 in a third direction T3 which is an arrangement direction of the neighboring bars 121. The sub-flow paths 1231 and 1232 may have a height defined between neighboring bars 121 of one pair. The variable portion 1242 may have a width that varies in an arrangement direction of the bars 121 at an end of the extending portion 1241. As shown in FIG. 5, the variable portion 1242 includes a vertical potion V at a center of an end of the extending portion 1241, a first taper portion C1 of which a width varies while extending from the vertical portion V to one bar 121, and a second taper portion C2 of which a width varies while extending from the vertical portion V to the other bar 121. For example, the vertical portion V may have a flat profile, and each of the first taper portion C1 and the second taper portion C2 may have a curved profile. By such a shape of the separation wall 124, a flow profile of a cooling medium may be formed three-dimensionally at a point from which the cooling medium diverges into the sub-flow paths 1231 and 1232 and at a point at which the cooling medium converges from the sub-flow paths 1231 and 1232.

In an example, the extending portion 1241 may have a length that extends in a first direction T1 which is a longitudinal direction of a bar 121. The sub-flow paths 1231 and 1232 may also extend in the longitudinal direction of the bar 121. The variable portion 1242 may have a width that varies in the longitudinal direction of the bar 121 at an end of the extending portion 1241. As shown in FIG. 9, the variable portion 1242 includes a third taper portion C3 on one side of the end of the extending portion 1241 based on a virtual centerline in the longitudinal direction of the extending portion 1241, and a fourth taper portion C4 on another side of the end of the extending portion 1241 based on the virtual centerline in the longitudinal direction of the extending portion 1241. For example, each of the third taper portion C3 and the fourth taper portion C4 may have substantially a linear profile or a curved profile. By such a shape of the separation wall 124, a cooling medium may be more smoothly led towards or from the sub-flow paths 1231 and 1232.

The separation wall 124 may be formed of a material suitable to promote a heat exchange between the sub-flow paths 1231 and 1232. For example, the separation wall 124 may be formed of a metal material or a non-metal material. When the mutual heat exchange between the sub-flow paths 1231 and 1232 is promoted, a temperature difference between the sub-flow paths 1231 and 1232 that may occur due to a temperature difference between neighboring battery cells 11 of one pair disposed on both sides from a center of the cooling structure 12 may be minimized. Thus, the cooling medium flowing in each of the sub-flow paths 1231 and 1232 may be maintained in a temperature equilibrium, which may contribute to the improvement of a lifespan of the battery system 1.

The upper frame 125A may be disposed above the bars 121, and connect the inlet-side frame 125C and the outlet-side frame 125D. The upper frame 125A may extend in a longitudinal direction of the bars 121. The lower frame 125B may be disposed under the bars 121, and connect the inlet-side frame 125C and the outlet-side frame 125D. The lower frame 125B may extend in the longitudinal direction of the bars 121. The inlet-side frame 125C may be connected to the upper frame 125A, the lower frame 1258, and the inlet-side support 1221, and extend in an arrangement direction of the bars 121. The outlet-side frame 125D may be connected to the upper frame 125A, the lower frame 125B, and the outlet-side support 1222, and extend in the arrangement direction of the bars 121.

In an example, the upper frame 125A and the lower frame 125B may be formed of a more flexible material than a material with which the bars 121 are formed. A thickness of the upper frame 125A and a thickness of the lower frame 1258 may be greater than a thickness of a bar 121. Through which, it is possible to improve tightness of the cooling structure 12 against an outside. In addition, even when a battery cell 11 is deformed beyond an expected range, it is possible to tolerate such a deformation by a certain level and prevent a cooling medium flowing the flow paths 123 from being leaked outside.

In an example, the frames 125A, 125B, 125C, and 125D may be integrally formed to be a single frame.

The bars 121, the support 122, and the frames 125A, 125B, 125C, and 125D may be formed of an insulating material. The insulating material may include a material suitable for electrical insulation between neighboring battery cells 11 of one pair. The insulating material may include plastic, for example.

The sealing portion 126 may surround the bars 121 and the flow paths 123. The sealing portion 126 may form a heat exchange space between the first cooling structure 12 and one pair of neighboring battery cells 11. For example, the heat exchange space may be defined by the bars 121, the support 122, the flow paths 123, the separation walls 124, the frames 125A, 125B, 125C, and 125D, the sealing portion 126, and a surface of the one pair of the neighboring battery cells 11. The heat exchange space may be closed from the outside except the inlet path P1 and the outlet path P2. The sealing portion 126 may be provided on one side of the first cooling structure 12 facing a large area portion 111 of one battery cell 11 of the neighboring battery cells 11 of one pair, and on another side of the first cooling structure 12 facing a large area portion 111 of the other battery cell 11 of the neighboring battery cells 11 of one pair.

The sealing portion 126 includes a plurality of longitudinal-direction grooves 1261, a plurality of arrangement-direction grooves 1262, and a plurality of connecting grooves 1263. The longitudinal-direction grooves 1261 may extend in the longitudinal direction of the bars 121, and be respectively formed in the upper frame 125A and the lower frame 125B. The arrangement-direction grooves 1262 may extend in the arrangement direction of the bars 121, and be respectively formed in the inlet-side frame 125C and the outlet-side frame 125D. The connecting grooves 1263 may connect the longitudinal-direction grooves 1261 and the arrangement-direction grooves 1262, and be respectively formed in the inlet-side frame 125C and the outlet-side frame 125D. For example, the connecting grooves 1263 may be rounded. The longitudinal-direction grooves 1261, the arrangement-direction grooves 1262, and the connecting grooves 1263 may form a closed loop. In the longitudinal-direction grooves 1261, the arrangement-direction grooves 1262, and the connecting grooves 1263, at least one sealing element (not shown) may be filled. The sealing element may include, for example, an O-ring, a liquid gasket, and the like.

Such a structure of the sealing portion 126 may cover a large area portion 111 of a battery cell 11. That is, the sealing portion 126 may form a two-dimensional (2D) sealing structure. In such a case, the at least one sealing element filled in the longitudinal-direction grooves 1261, the arrangement-direction grooves 1262, and the connecting grooves 1263 may be in contact with the large area portion 111 of the battery cell 11, but not in contact with a small area portion 112 of the battery cell 11. Thus, it may be more convenient in manufacturing the sealing portion 126. In addition, it may more readily prevent a cooling medium from being leaked out simply by pressing the large area portion 111 of the battery cell 11 by the first cooling structure 12 in one direction. Meanwhile, when designing the first cooling structure 12, a dimension of the flow paths 123 may change due to such a 2D sealing structure of the sealing portion 126. In such a case, a separation wall 124 may separate a flow path 123 into a plurality of sub-flow paths 1231 and 1232, and it is thus possible to maintain or improve a flow rate of a cooling medium flowing in the flow path 123.

In an example not illustrated, the sealing portion 126 may form a closed loop by the longitudinal-direction grooves 1261 and the arrangement-direction grooves 1262 without the connecting grooves 1263.

Figure 12:
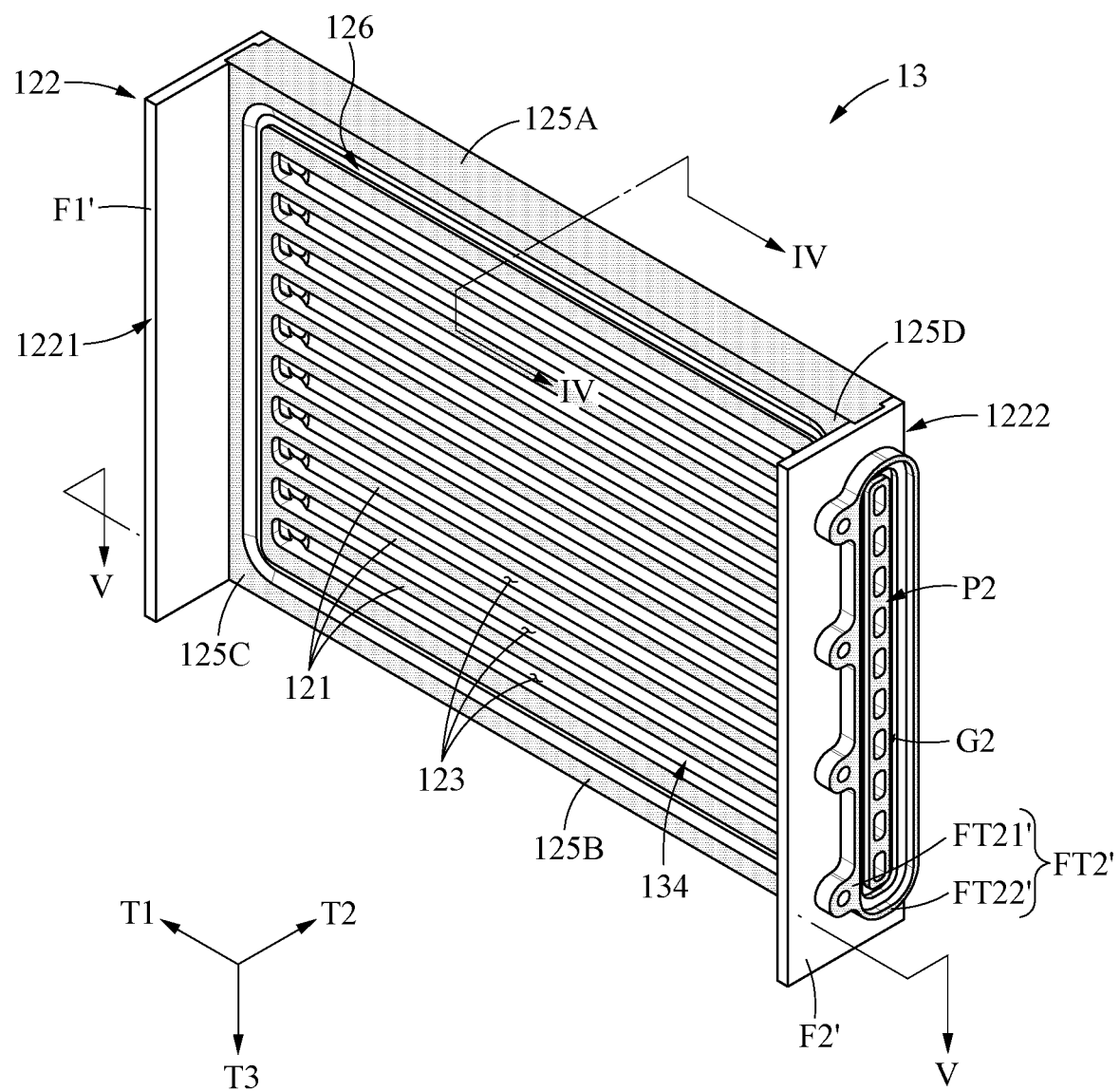
FIG. 12 is a perspective view of an example of a second cooling structure.
Figure 13:
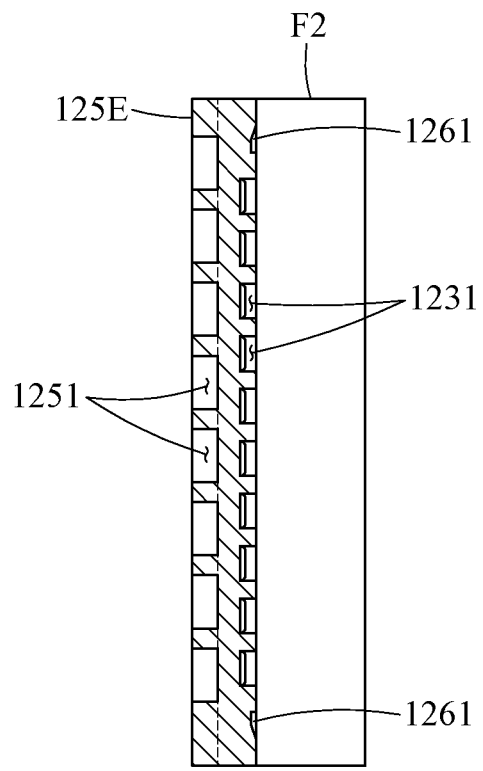
FIG. 13 is a cross-sectional view of the second cooling structure of FIG. 12 cut by a line IV-IV.
Figure 14:
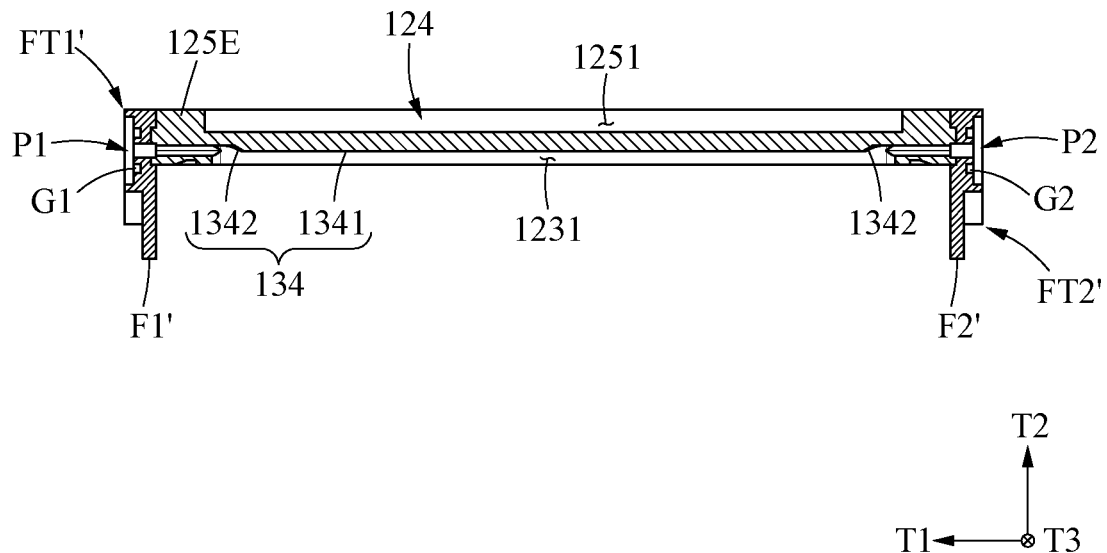
FIG. 14 is a cross-sectional view of the second cooling structure of FIG. 12 cut by a line V-V.

Referring to FIGS. 12 through 14, the second cooling structure 13 includes a plurality of bars 121, a support 122 including an inlet-side support 1221 and an outlet-side support 1222, a plurality of flow paths 123, a plurality of frames 125A, 125B, 125C, and 125D, and a sealing portion 126 that are described above with reference to FIGS. 3 through 11.

As shown in FIG. 13, the second cooling structure 13 further includes a rear frame 125E. The rear frame 125E may be formed on a rear side of the upper frame 125A, the lower frame 125B, the inlet-side frame 125C, and the outlet-side frame 125D. The rear frame 125E includes a plurality of recesses 1251 disposed separately from each other in the arrangement direction of the bars 121. The rear frame 125E may be formed of a material having a relatively low thermal conductivity coefficient to form a closed heat exchange space. In addition, to improve structural stability, the bars 121 may be fixed to the rear frame 125E. The frames 125A, 125B, 125C, and 125D along with the rear frame 125E may be provided in an integral form.

The sealing portion 126 may be formed only on a side surface of the second cooling structure 13 that faces a large area portion 111 (refer to FIG. 2) of a battery cell 11 supported and pressed by the second cooling structure 13.

The inlet-side support 1221 and the outlet-side support 1222 of the second cooling structure 13 respectively include an inlet-side flange F1' and an outlet-side flange F2' that extend only in one direction based on the bars 121. The inlet-side flange F1' and the outlet-side flange F2' may extend only in one direction, and thus a plurality of inlet-side fastening elements (not shown) of an inlet-side fastening portion FT1' and a plurality of outlet-side fastening elements FT22' of an outlet-side fastening portion FT2' may be formed on one side based on a first support wall (not shown) and a second support wall FT21', respectively.

Dissimilar to the first cooling structure 12, a flow path 123 of the second cooling structure 13 includes a single flow path 1231 without being separated into a plurality of sub-flow paths. To maintain or improve a flow rate of a cooling medium flowing in the single flow path 1231, a width of the single path 1231 may be reduced. For example, the single flow path 1231 includes a protrusive wall 1341 protruding towards an open portion of the single flow path 123, and a variable portion 1342 configured to guide smoothly the cooling medium to flow from the inlet path P1 into the single flow path 1231 and guide smoothly the cooling medium to flow from the single path 1231 into the outlet path P2. For example, the variable portion 1342 may have a curved profile.

Figure 15:
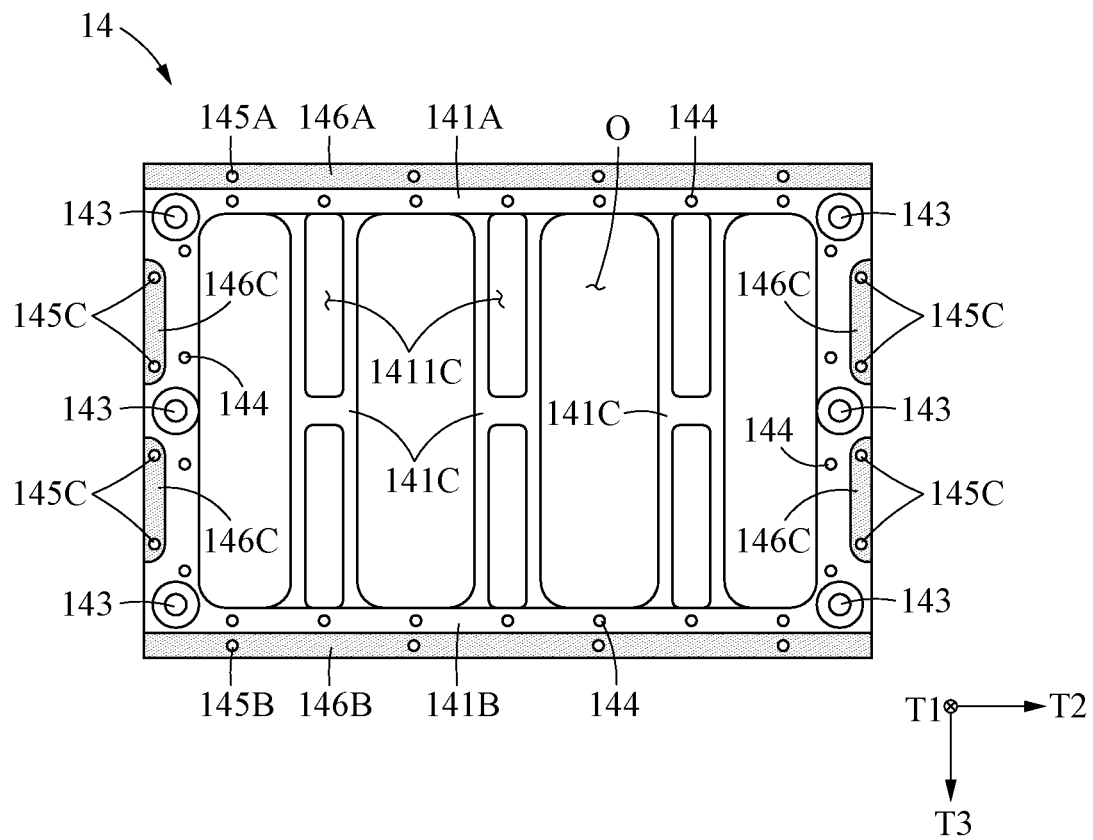
FIG. 15 is a front view of an example of a first plate of the battery system of FIG. 2.
Figure 16:
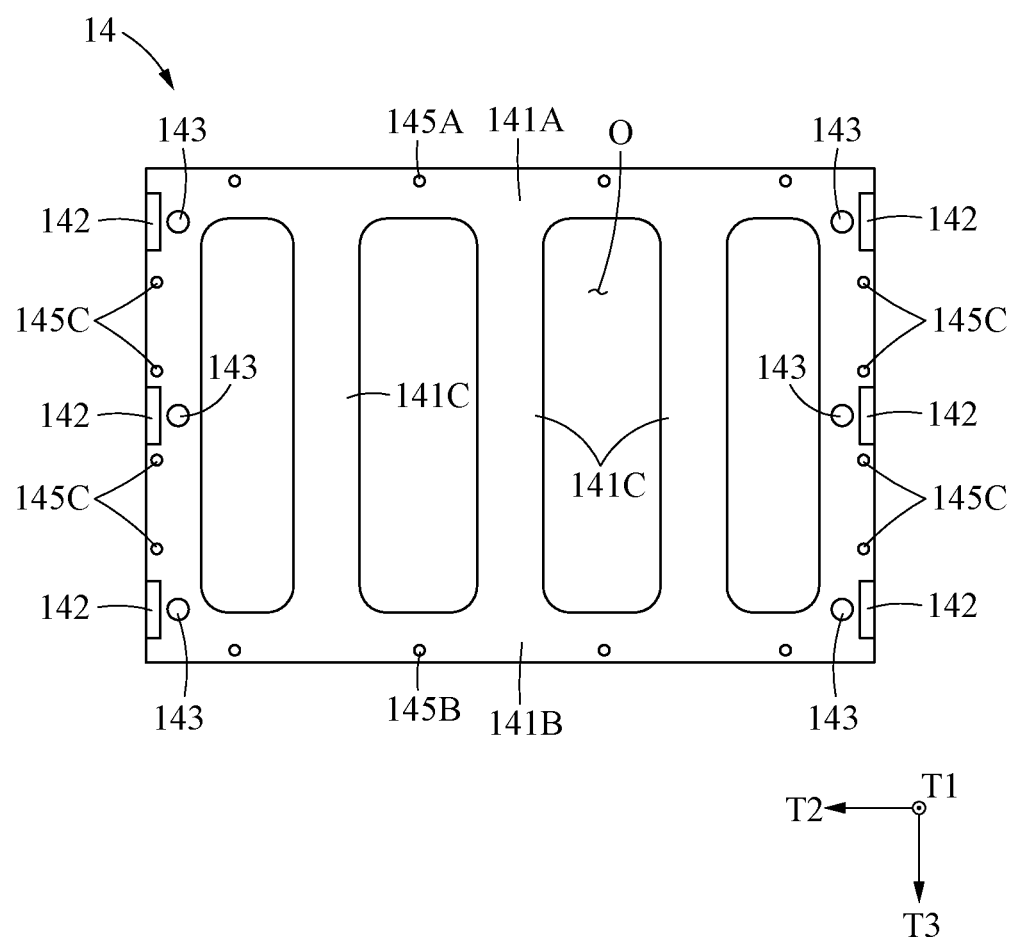
FIG. 16 is a rear view of an example of the first plate of FIG. 2.
Figure 17:
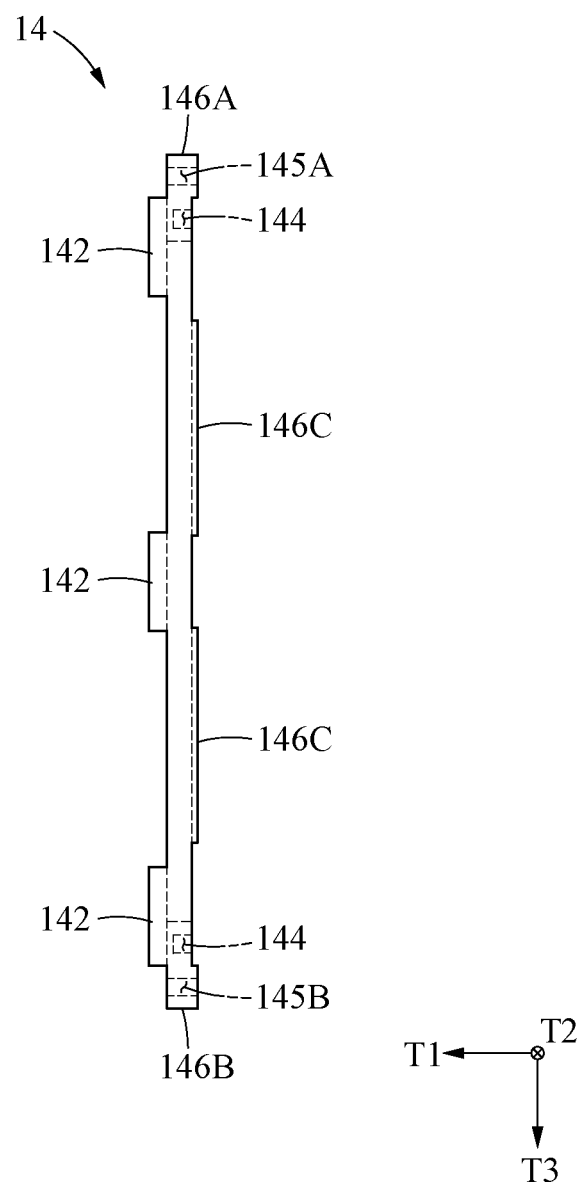
FIG. 17 is a side view of an example of the first plate of FIG. 2.

Referring to FIGS. 15 through 17, the first plate 14 includes a first base 141, a plurality of first side protrusions 142, a plurality of first plate fastening portions 143, a plurality of gasket fastening portions 144, a plurality of upper fastening portions 145A, a plurality of lower fastening portions 145B, a plurality of side fastening portions 145C, an upper protrusion 146A, a lower protrusion 146B, and a plurality of second side protrusions 146C.

The first base 141 may surround an inlet path P1 or an outlet path P2 of a plurality of cooling structures 12 and 13. For example, the first base 141 includes an upper portion 141A and a lower portion 141B, and a plurality of vertical portions 141C extending between the upper portion 141A and the lower portion 141B and disposed separately from each other to define an opening O connected to the inlet path P1 or the outlet path P2. The upper portion 141A, the lower portion 141B, and the vertical portions 141C may be formed such that a size of the opening O fits the shape of the cooling structures 12 and 13. In addition, a portion 1411C recessed in a thickness direction of the first base 141 is formed in an upper and/or lower portion of the vertical potions 141C.

The first side protrusions 142 may protrude from the first base 141, or a side portion 141D of the first base 141. When neighboring first plates 14 of one pair are connected, first plate fastening portions 143 of one first plate 14 of the neighboring first plates 14 may be fastened to first plate fastening portions 143 of the other first plate 14 of the neighboring first plates 14. When the first plate 14 and the second plate 15 (refer to FIG. 2) are connected to each other, the first side protrusions 142 may be disposed on a plurality of corner connecting portions 156 and a plurality of edge connecting portions 157 (refer to FIG. 18) of the second plate 15, and overlap at least a portion of the corner connecting portions 156 and the edge connecting portions 157. When neighboring battery modules 10 of one pair are connected, a gasket fastening portion 144 of a first plate 14 of one battery module 10 of the neighboring battery modules 10 may be connected to a gasket fastening portion 144 of a first plate 14 of the other battery module 10 of the neighboring battery modules 10 through a through-hole GH of a gasket SG to be described hereinafter.

The first plate 14 and the second plate 15 surrounding the battery module 10 (refer to FIG. 1) may be fastened to a cover (not shown) configured to cover an upper portion and a lower portion of the battery cells 11. The gasket fastening portions 144 may be arranged separately from each other along edges of the first base 141.

The upper fastening portions 145A may connect an upper portion of a first plate 14 of one battery module 10 (refer to FIG. 1) and an upper portion of a first plate 14 of another battery module 10. The lower fastening portions 145B may connect a lower portion of a first plate 14 of one battery module 10 and a lower portion of a first plate 14 of another battery module 10. The side fastening portions 145C may connect a side of a first plate 14 of one battery module 10 and a side of a first plate 14 of another battery module 10. For example, the upper fastening portions 145A may be formed along an edge of the upper portion 141A of the first base 141, and the lower fastening portions 145B may be formed along an edge of the lower potion 141B of the first base 141. The side fastening portions 145C may be formed along the side portion 141D of the first base 141. When neighboring battery modules 10 of one pair are connected, the upper fastening portions 145A, the lower fastening portions 145B, and the side fastening portions 145C may provide a uniform 2D fastening force to all portions to be connected between the neighboring battery modules 10. Thus, it is possible to ensure an advantageous tight structure of a cooling medium between neighboring cooling structures 12 and 13 of one pair to be connected between the neighboring battery modules 10.

When the first plate 14 is disposed to surround the inlet path P1 or the outlet path P2 of a plurality of cooling structures 12 and 13 and cover a small area portion 112 of a plurality of battery cells 11, the upper fastening portions 145A and the lower fastening portions 145B may be formed on the first base 141 such that they are disposed on the virtual centerline EX1 (refer to FIG .10) of the inlet path P1 or the virtual centerline EX2 (refer to FIG. 11) of the outlet path P2. Such positions of the upper fastening portions 145A and the lower fastening portions 145B may ensure a sufficient pressing force of the first plate 14 with respect to the battery cells 11.

Figure 19:
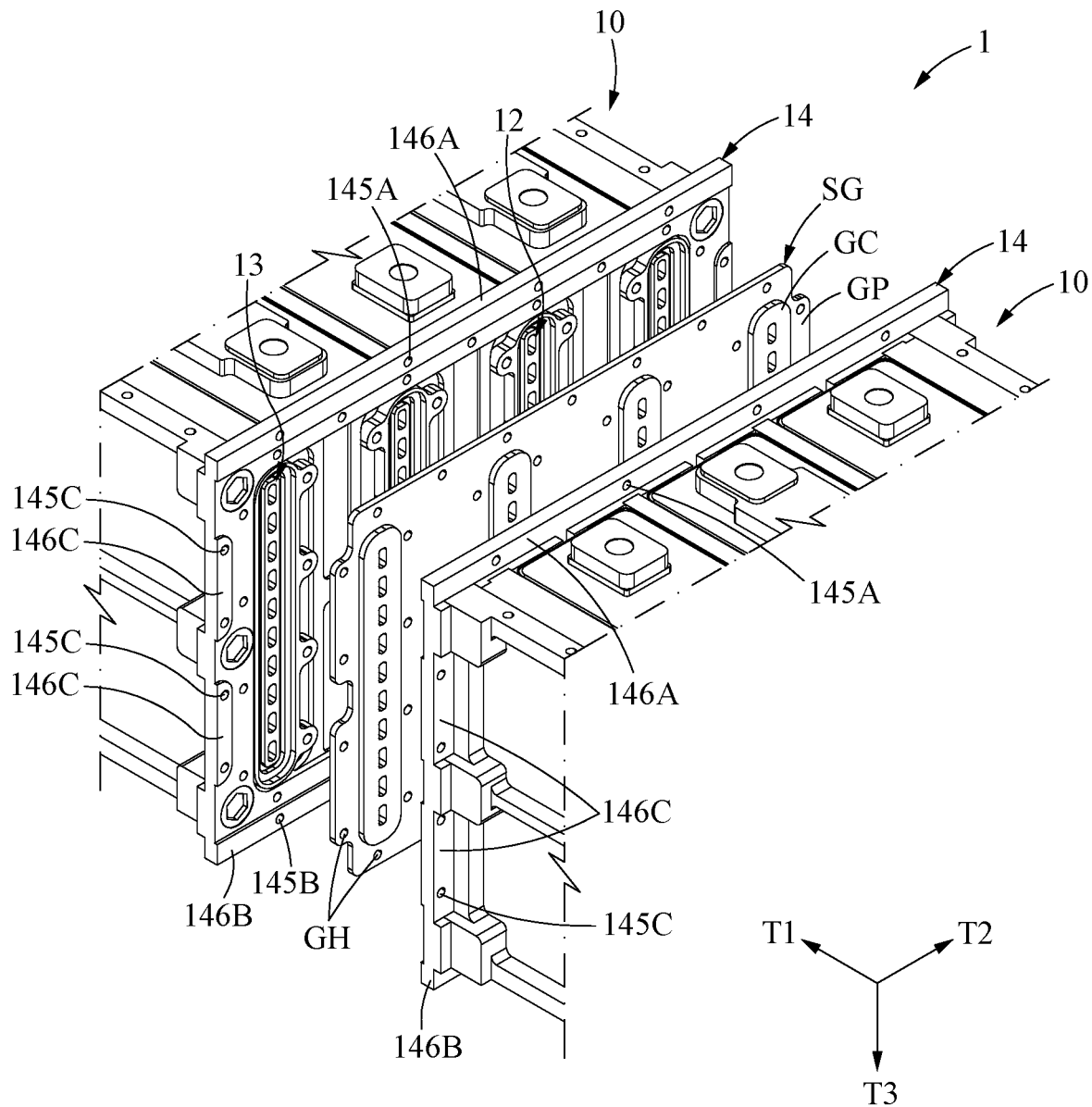
FIG. 19 is a partial perspective view of an example of a battery system including a plurality of battery modules.
Figure 20:
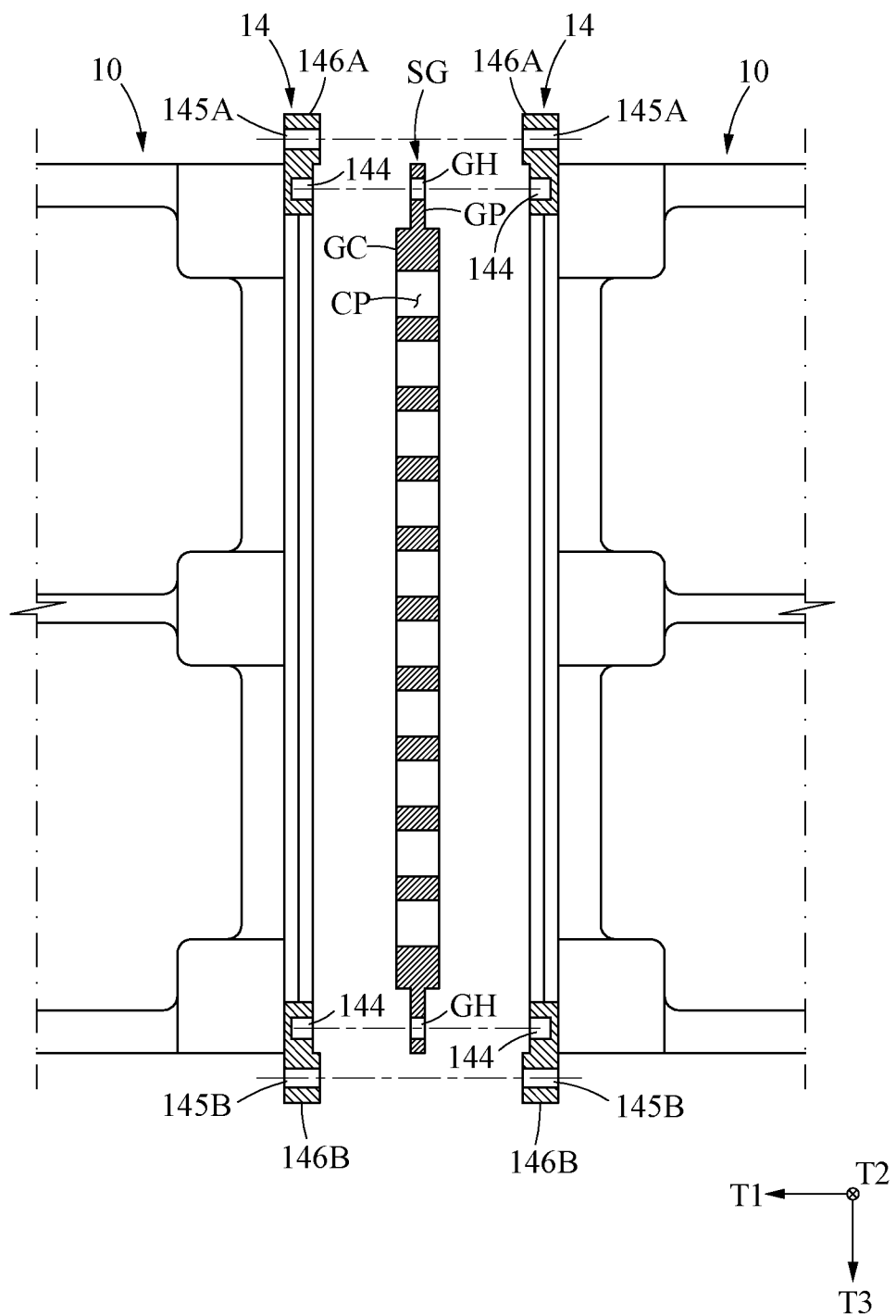
FIG. 20 is a cross-sectional side view of a portion of the battery system of FIG. 19.
Figure 21:
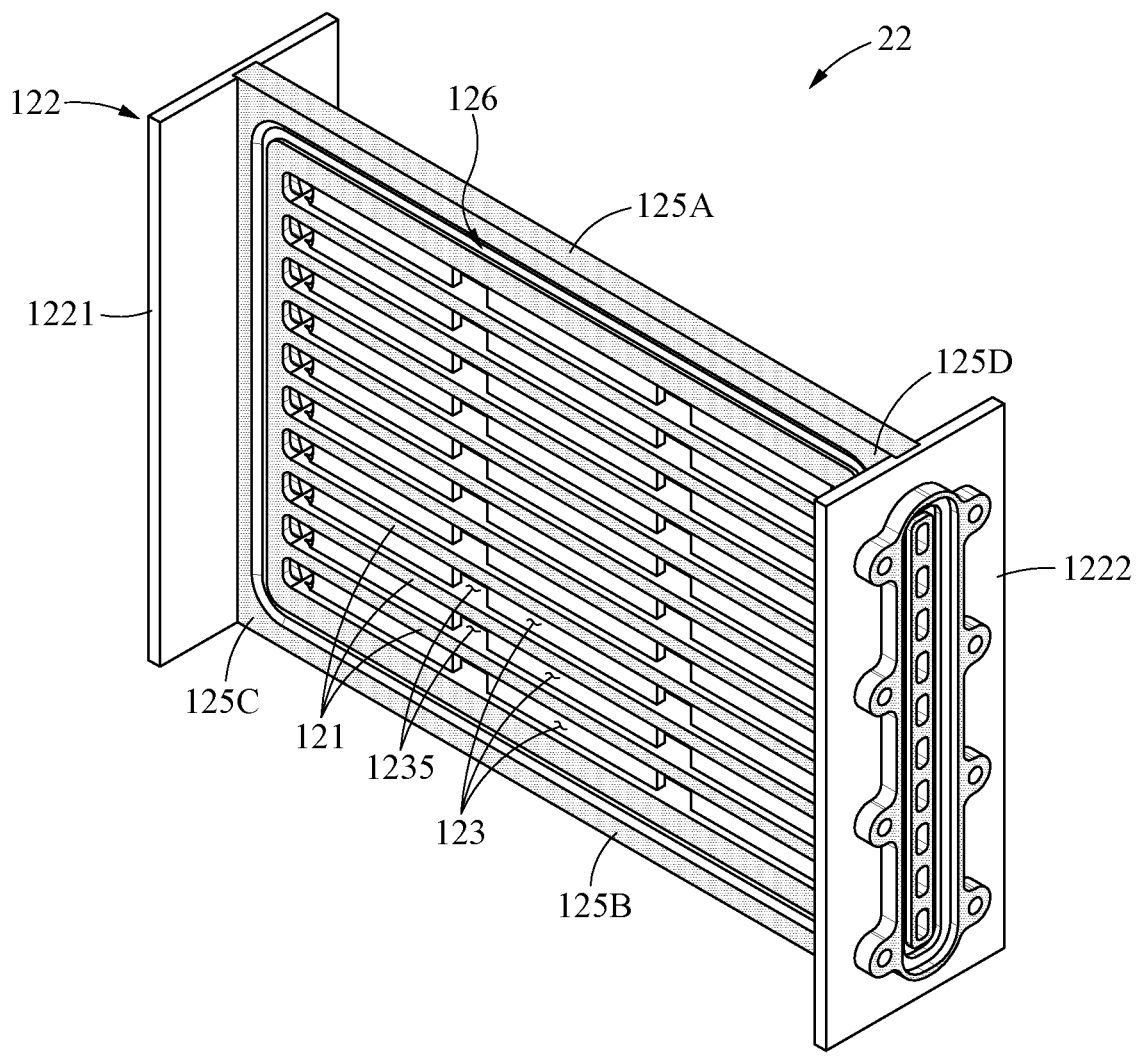
FIG. 21 is a perspective view of another example of a first cooling structure.

The upper protrusion 146A may protrude from the first base 141 at an upper edge of the upper portion 141A of the first base 141 or at a position adjacent to the upper edge. The lower protrusion 146B may protrude from the first base 141 at a lower edge of the lower portion 141B of the first base 141 or at a position adjacent to the lower edge. A protruding direction of the upper protrusion 146A and a protruding direction of the lower protrusion 146B may be an opposite direction of a protruding direction of the first side protrusions 142. For example, when neighboring battery modules 10 of one pair are connected, a protruding direction of an upper protrusion 146A formed in a first plate 14 of one battery module 10 of the neighboring battery modules 10 and a protruding direction of a lower protrusion 146B formed in the first plate 14 of the battery module 10 may be towards a first plate 14 of the other battery module 10 of the neighboring battery modules 10 facing the first plate 14 of the battery module 10. In such an example, as illustrated in FIGS. 19 through 21, when neighboring first plates 14 of one pair used for connecting neighboring battery modules 10 of one pair are connected, an upper protrusion 146A of one first plate 14 of one battery module 10 may be connected to an upper protrusion 146A of the other first plate 14 of the other battery module 19, a lower protrusion 146B of the first plate 14 of the one battery module 10 and a lower protrusion 146B of the first plate 14 of the other battery module 10 may be connected, and a space may be formed between the upper protrusions 146A and the lower protrusions 146B. Such a protruding structure of the first plate 14 that is formed by the upper protrusion 146A and the lower protrusion 146B may be effective to avoid interference with another structure.

The upper fastening portions 145A may be formed in the upper protrusion 146A along a direction of the upper protrusion 146A. The lower fastening portions 145B may be formed in the lower protrusion 146B along a direction of the lower protrusion 146B.

The second side protrusions 146C may protrude from the first base 141 in the side portion 141D of the first base 141. A protruding direction of the second side protrusions 146C may be an opposite direction of a protruding direction of the first side protrusions 142. The second side protrusions 146C may be formed on both sides of the first base 141, and formed separately from each other along each of edges of both sides of the first base 141. The side fastening portions 145C may be formed in the second side protrusions 145C along one of the second side protrusions 146C.

Figure 18:
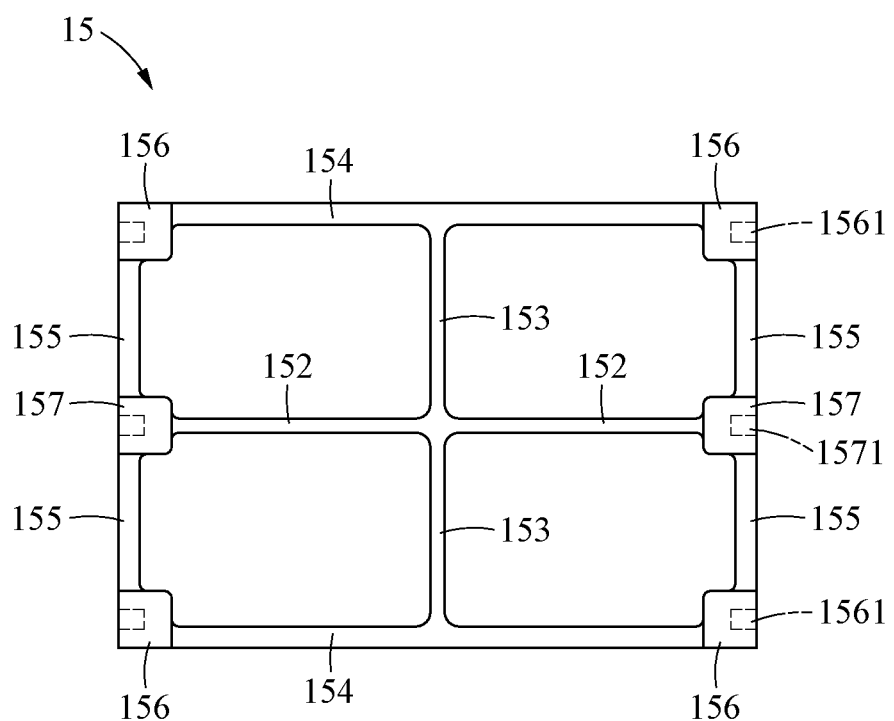
FIG. 18 is a front view of an example of a second plate of the battery system of FIG. 2.
Figure 18:
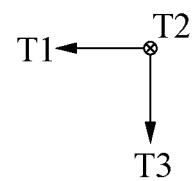

Referring to FIG. 18, the second plate 15 includes a second base 151, a plurality of horizontal-direction center ribs 152, a plurality of vertical-direction center ribs 153, a plurality of horizontal-direction edge ribs 154, a plurality of vertical-direction edge ribs 155, a plurality of corner connecting portions 156, and a plurality of edge connecting portions 157.

The horizontal-direction center ribs 152 may extend from a center of the second base 151 towards a side edge of the second base 151 in a first direction T1 which is a horizontal direction. The vertical-direction center ribs 153 may extend from the center of the second base 151 towards an upper edge and a lower edge of the second base 151 in a third direction T3 which is a vertical direction. The horizontal-direction center ribs 152 and the vertical-direction center ribs 153 may meet each other at the center of the second base 151.

The horizontal-direction edge ribs 154 may extend along the upper edge and the lower edge of the second base 151. The vertical-direction edge ribs 155 may extend along the side edges of the second base 151.

The corner connecting portions 156 may connect the horizontal-direction edge ribs 154 and the vertical-direction edge ribs 155 at corners of the second base 151. The edge connecting portions 157 may connect the horizontal-direction edge ribs 154 and the vertical-direction edge ribs 155 at the side edges of the second base 151. The corner connecting portions 156 and the edge connecting portions 157 may include fastening holes 1561 and 1571, respectively, to be fastened to the first plate fastening portions 143.

The horizontal-direction center ribs 152, the vertical-direction center ribs 153, the horizontal-direction edge ribs 154, the vertical-direction edge ribs 155, the corner connecting portions 156, and the edge connecting portions 157 may protrude from the second base 151. In addition, a protruding length of the corner connecting portions 156 and the edge connecting portions 157 may be greater than a protruding length of the horizontal-direction center ribs 152, the vertical-direction center ribs 153, the horizontal-direction edge ribs 154, and the vertical-direction edge ribs 155.

Referring to FIGS. 19 and 20, the battery system 1 further includes a gasket SG to be disposed between neighboring battery modules 10 of one pair when connecting the neighboring battery modules 10. The gasket SG is configured to seal a gap between cooling structures 12 and 13 of one pair facing each other of the neighboring battery modules 10. The gasket SG includes a gasket plate GP and a gasket protrusion GC.

The gasket plate GP may be connected to one pair of neighboring first plates 14 facing each other. The gasket plate GP may be received in an internal space formed by the one pair of the neighboring first plates 14 between the upper protrusion 146A and the lower protrusion 146B of the first plates 14. The gasket plate GP may have a plurality of through-holes GH. Through the through-holes GH, the gasket plate GP may be fastened to gasket fastening portions 144 and second side fastening portions 145C of each of the neighboring first plates 14 facing each other.

The gasket protrusion GC may protrude from the gasket plate GP. For example, the gasket protrusion GC may protrude in both normal line directions of the gasket plate GP. The gasket protrusion GC may be received in the first support wall FT11 (refer to FIG. 10) of the inlet-side support 1221 and the second support wall FT21 (refer to FIG. 11) of the outlet-side support 1222.

The gasket protrusion GC includes a plurality of connecting paths CP. The connecting paths CP may communicate with the inlet path P1 and the outlet path P2 of the cooling structures 12 and 13 facing each other. Respective positions of the connecting paths CP may correspond to respective positions of the inlet ports P11 (refer to FIG. 10) and the outlet ports P21 (refer to FIG. 11).

Figure 22:
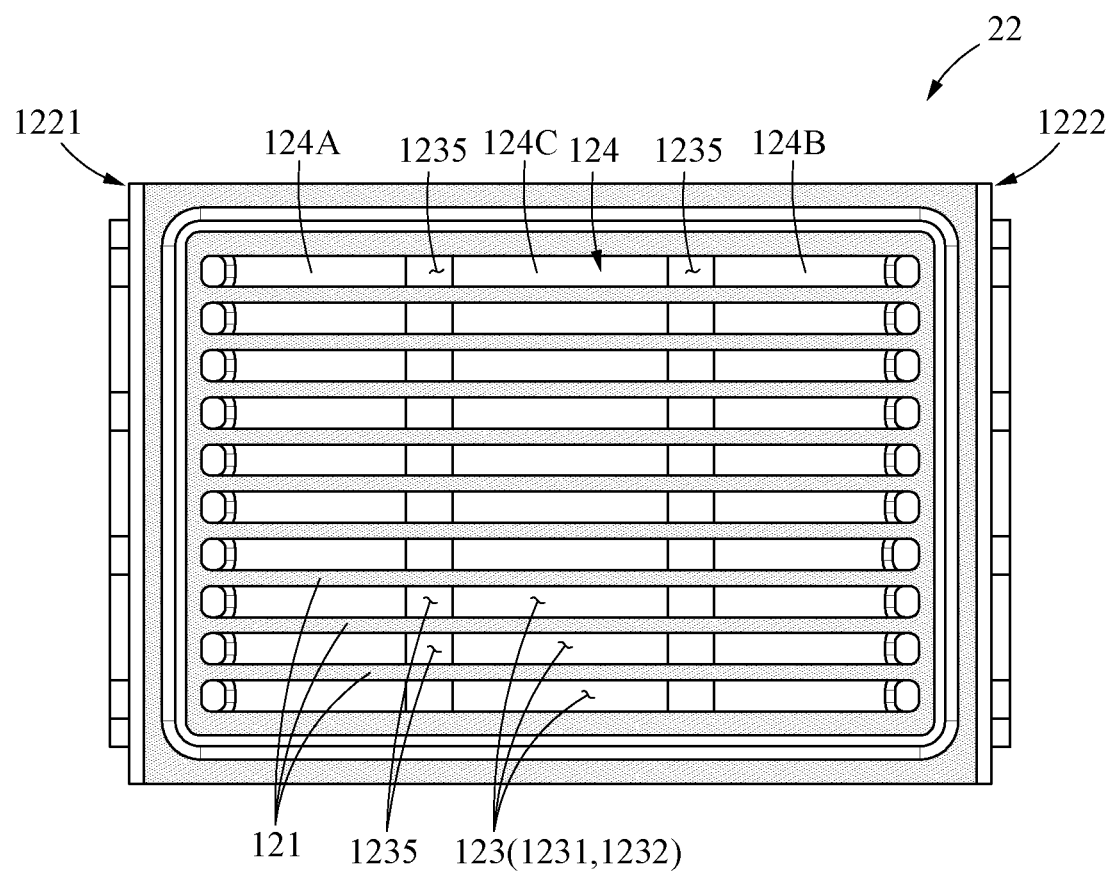
FIG. 22 is a front view of the first cooling structure of FIG. 21.

Referring to FIGS. 21 and 22, according to another example, a cooling structure 22 includes a plurality of bars, a support 122 including an inlet-side support 1221 and an outlet-side support 1222, a plurality of flow paths 123, a plurality of separation walls 124, a plurality of frames 125A, 125B, 125C, and 125D, and a sealing portion 126 that are described above with reference to FIGS. 3 through 11. In the cooling structure 22, a separation wall 124 includes a plurality of sub-separation walls 124A, 124B, and 124C disposed separately in a longitudinal direction of the bars 121. A flow path 123 may be formed between neighboring sub-separation walls of one pair and further includes a fluid connecting hole 1235 configured to allow a plurality of sub-flow paths 1231 and 1232 to communicate with each other. The sub-separation walls 124A, 124B, and 124C include a first sub-separation wall 124A disposed adjacent to the inlet-side support 1221, a second sub-separation wall 1248 disposed adjacent to the outlet-side support 1222, and a third sub-separation wall 124C disposed between the first sub-separation wall 124A and the second sub-separation wall 124B. While a cooling medium is flowing in the sub-flow paths 1231 and 1232 led from the inlet-side support 1221 to the outlet-side support 1222, the cooling medium flowing in each of the sub-flow paths 1231 and 1232 may be mixed together through the fluid connecting hole 1235. Such a structure described above may be used to reduce a difference between a temperature of a cooling medium for cooling a battery cell disposed on one side from the cooling structure 22 and a temperature of a cooling medium for cooling another battery cell disposed on another side from the cooling structure 22, and thus the cooling medium flowing in each of the sub-flow paths 1231 and 1232 may have a uniform temperature. Thus, it is possible to increase temperature uniformity of one pair of neighboring battery cells facing each other from the cooling structure 22.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A cooling structure comprising:
   a plurality of bars arranged separately from each other and configured to press a battery cell;
   a support configured to support the plurality of bars;
   flow paths defined by a first surface of the battery cell and one pair of neighboring bars, and configured to guide a flow of a cooling medium, with the cooling medium being in direct contact with the first surface of the battery cell;
   a separation wall provided in at least one of the flow paths and being configured to separate each of the at least one flow path into sub-flow paths; and
   a sealing portion configured to surround the plurality of bars and the flow paths,
   wherein the sealing portion comprises:
   one pair of longitudinal-direction grooves extending in a longitudinal direction of the plurality of bars and configured to be in contact with the first surface of the battery cell; and
   one pair of arrangement-direction grooves configured to be connected to the longitudinal-direction grooves and extending in an arrangement direction of the plurality of bars, and configured to be in contact with the first surface of the battery cell, and
   wherein the one pair of the longitudinal-direction grooves and the one pair of the arrangement-direction grooves form a closed loop.

2. The cooling structure of claim 1, wherein the separation wall comprises:

an extending portion having a height that extends between neighboring bars of one pair in an arrangement direction of the plurality of bars.

3. The cooling structure of claim 2, wherein the separation wall further comprises:
a variable portion disposed at an end of the extending portion and having a width that varies in the arrangement direction of the plurality of bars.

4. The cooling structure of claim 1, wherein the separation wall comprises:
an extending portion having a length that extends in a longitudinal direction of the plurality of bars.

5. The cooling structure of claim 4, wherein the separation wall further comprises:
a variable portion disposed at an end of the extending portion and having a width that varies in the longitudinal direction of the plurality of bars.

6. The cooling structure of claim 1, wherein the support comprises:
an inlet-side support comprising an inlet path configured to guide the cooling medium to flow into the flow paths; and
an outlet-side support comprising an outlet path configured to guide the cooling medium to flow out of the flow paths.

7. The cooling structure of claim 6, wherein the at least one flow path comprises:
a divergent space defined between the inlet path and the separation wall, and configured to guide the cooling medium to diverge from the inlet path into the sub-flow paths; and
a convergent space defined between the outlet path and the separation wall, and configured to guide the cooling medium to converge into the outlet path from the sub-flow paths.

8. The cooling structure of claim 6, wherein:
the inlet-side support further comprises a first sealing groove configured to form a closed loop by surrounding the inlet path, and
the outlet-side support further comprises a second sealing groove configured to form a closed loop by surrounding the outlet path.

9. The cooling structure of claim 6, wherein:
the inlet-side support comprises an inlet-side fastening portion configured to form a closed loop by surrounding the inlet path, protruding from a surface of the inlet-side support, and configured to be connected to an outlet-side support of another cooling structure, and
the outlet-side support further comprises an outlet-side fastening portion configured to form a closed loop by surrounding the outlet path, protruding from a surface of the outlet-side support, and configured to be connected to an inlet-side support of another cooling structure.

10. The cooling structure of claim 1, wherein the sealing portion further comprises:
connecting grooves configured to connect the one pair of the longitudinal-direction grooves and the one pair of the arrangement-direction grooves and to form the closed loop, having a round shape, and configured to be in contact with the first surface of the battery cell.

11. The cooling structure of claim 1, wherein the battery cell has a large area portion and a small area portion that is smaller in size than the large area portion,
wherein the plurality of bars are configured to support the large area portion, and the support is configured to support the small area portion.

12. The cooling structure of claim 1, further comprising:
a fluid connecting hole passing through the separation wall and being configured to allow the sub-flow paths to communicate with each other.

13. The cooling structure of claim 12, wherein the support comprises:
an inlet-side support comprising an inlet path configured to guide a cooling medium to flow into the flow paths; and
an outlet-side support comprising an outlet path configured to guide the cooling medium to flow out of the flow paths,
wherein the separation wall comprises a first separation wall adjacent to the inlet path and a second separation wall adjacent to the outlet path, and
the fluid connecting hole is formed between the first separation wall and the second separation wall.

14. A batter system comprising:
battery cells each having a large area portion and a small area portion that is smaller in size than the large area portion; and
cooling structures disposed in the large area portion of the battery cells,
wherein each of the cooling structures comprises:
bars disposed separately from each other and configured to press a corresponding battery cell;
a support configured to support the bars and to extend in an arrangement direction of the bars;
flow paths defined by a large area portion of the battery cell and one pair of neighboring bars, and configured to guide a flow of a cooling medium with the cooling medium being in direct contact with the large area portion of the battery cell;
a separation wall provided in at least one of the flow paths and being configured to separate each of the at least one flow path into sub-flow paths; and
a sealing portion configured to surround the plurality of bars and the flow paths,
wherein the sealing portion comprises:
one pair of longitudinal-direction grooves extending in a longitudinal direction of the plurality of bars and configured to be in contact with the first surface of the battery cell; and
one pair of arrangement-direction grooves configured to be connected to the longitudinal-direction grooves and extending in an arrangement direction of the plurality of bars, and configured to be in contact with the first surface of the battery cell, and
wherein the one pair of the longitudinal-direction grooves and the one pair of the arrangement-direction grooves form a closed loop.

15. The battery system of claim 14, further comprising:
a first plate facing the small area portion of each of the battery cells, and configured to press the battery cells.

16. The battery system of claim 15, wherein the first plate comprises:
a base; and
a fastening portion formed adjacent to an edge of the base, and being configured to be connected to a first plate of another battery system.

17. The battery system of claim 16, wherein the fastening portion comprises:
a side fastening portion adjacent to a side edge of the base;
an upper fastening portion adjacent to an upper edge of the base; and
a lower fastening portion adjacent to a lower edge of the base.

18. The battery system of claim 17, wherein the support comprises:
an inlet-side support comprising an inlet path configured to guide the cooling medium to flow into the flow paths; and
an outlet-side support comprising an outlet path configured to guide the cooling medium to flow out of the flow paths,
wherein the upper fastening portion and the lower fastening portion are disposed on a virtual centerline of the inlet path and a virtual centerline of the outlet path, respectively.

19. The battery system of claim 17, wherein the first plate comprises:
an upper protrusion comprising the upper fastening portion and protruding from the base; and
a lower protrusion comprising the lower fastening portion and protruding from the base.

20. The battery system of claim 15, further comprising:
a second plate configured to be connected to the first plate, and configured to press a cooling structure disposed in a large area portion of an outermost battery cell among the battery cells against the outermost battery cell.

21. A battery system comprising:
a first battery module; and
a second battery module,
wherein each of the first battery module and the second battery module comprises:
battery cells;
cooling structures disposed in a large area portion of the battery cells; and
a first plate configured to cover a small area portion of battery cells,
wherein each of the cooling structures comprises:
bars disposed separately from each other and configured to press a corresponding battery cell;
a support configured to support the bars and to extend in an arrangement direction of the bars; and
flow paths defined by a large area portion of the battery cell and one pair of neighboring bars, and configured to guide a cooling medium with the cooling medium being in direct contact with the large area portion of the battery cell,
wherein the first plate of the first battery module and the first plate of the second battery module are configured to be connected to each other,
wherein the support comprises:
an inlet-side support comprising an inlet path configured to guide a flow of the cooling medium into the flow paths; and
an outlet-side support comprising an outlet path configured to guide a flow of the cooling medium out of the flow paths, and
wherein the battery system further comprises a gasket disposed between the first plate of the first battery module and the first plate of the second battery module, and being configured to tightly seal a space around the inlet path and the outlet path.

22. The battery system of claim 21, wherein the gasket comprises:
a gasket plate configured to be fastened to the first plate of the first battery module and the first plate of the second battery module;
a gasket protrusion protruding from the gasket plate; and
a connecting path formed in the gasket protrusion and configured to communicate with the inlet path and the outlet path.

\* \* \* \* \*